United States Patent
Masaki et al.

(10) Patent No.: US 11,236,699 B2
(45) Date of Patent: Feb. 1, 2022

(54) INSTALLATION TOOL, INTERNAL COMBUSTION ENGINE, AND METHOD FOR INSTALLING CAMSHAFT

(71) Applicant: HONDA MOTOR CO., LTD., Tokyo (JP)

(72) Inventors: Shinji Masaki, Tokyo (JP); Keita Matsuo, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 174 days.

(21) Appl. No.: 16/453,043

(22) Filed: Jun. 26, 2019

(65) Prior Publication Data

US 2020/0063689 A1 Feb. 27, 2020

(30) Foreign Application Priority Data

Aug. 27, 2018 (JP) .............................. JP2018-158651

(51) Int. Cl.
| | | |
|---|---|---|
| B25B 27/00 | (2006.01) | |
| F02F 7/00 | (2006.01) | |
| B23P 19/04 | (2006.01) | |
| F01L 1/047 | (2006.01) | |

(52) U.S. Cl.
CPC ............ *F02F 7/006* (2013.01); *B23P 19/042* (2013.01); *B25B 27/0035* (2013.01); *F01L 1/047* (2013.01); *F01L 2001/0476* (2013.01)

(58) Field of Classification Search
CPC ...... B66F 15/00; B25B 27/0035; B25B 27/00
See application file for complete search history.

(56) References Cited

U.S. PATENT DOCUMENTS

| 8,127,387 B2 * | 3/2012 | Tygh ...................... A62B 3/005 |
| | | 7/166 |
| 2015/0014612 A1 * | 1/2015 | Liou ........................ B25D 1/04 |
| | | 254/26 R |
| 2020/0063689 A1 * | 2/2020 | Masaki ................... F02F 7/006 |

FOREIGN PATENT DOCUMENTS

| JP | S47-010323 Y | 4/1972 |
| JP | S60-016016 U | 2/1985 |
| JP | S60-043103 U | 3/1985 |

(Continued)

OTHER PUBLICATIONS

Japanese Office Action with English translation dated Mar. 17, 2020, 7 pages.

*Primary Examiner* — Lee D Wilson
(74) *Attorney, Agent, or Firm* — Rankin, Hill & Clark LLP

(57) ABSTRACT

An installation tool installs a camshaft to a lower supporting portion. A cylinder head of an internal combustion engine includes the lower supporting portion, a cam holder, and a half-thrust washer. The camshaft is sandwiched between the cam holder and the lower supporting portion via a bearing. The half-thrust washer is inserted into respective annular groove disposed in an outer peripheral surface of the bearing and half annular groove disposed in the cam holder. The installation tool includes a bearing holder that holds the bearing, a head abutting portion abutted against a reference surface of the lower supporting portion with the bearing held, and an opposed concave knock portion into which a knock collar disposed in the cam holder is inserted to adjust a position of the half annular groove with respect to the half-thrust washer.

19 Claims, 21 Drawing Sheets

(56) References Cited

FOREIGN PATENT DOCUMENTS

JP       S60-161724 U    10/1985
JP          5509238     6/2014

* cited by examiner

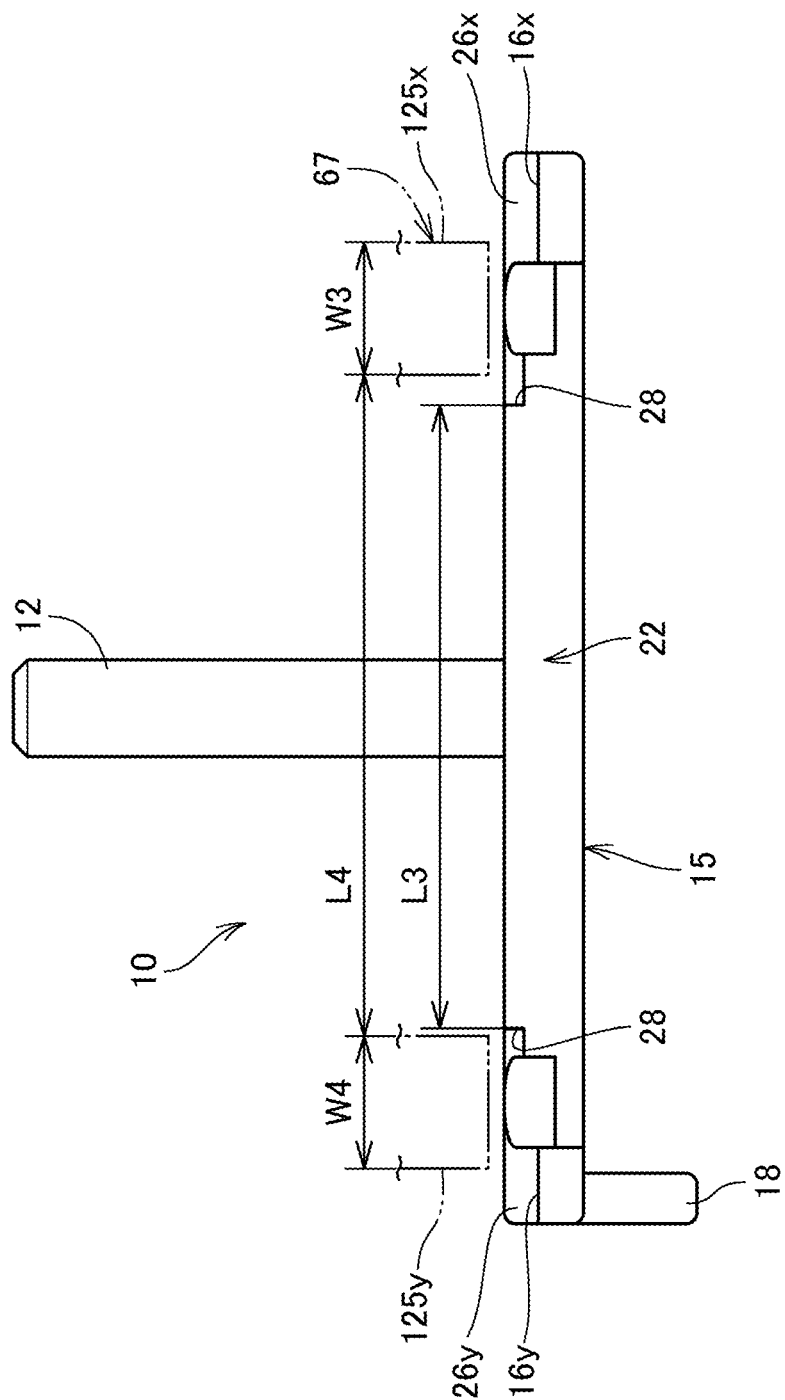

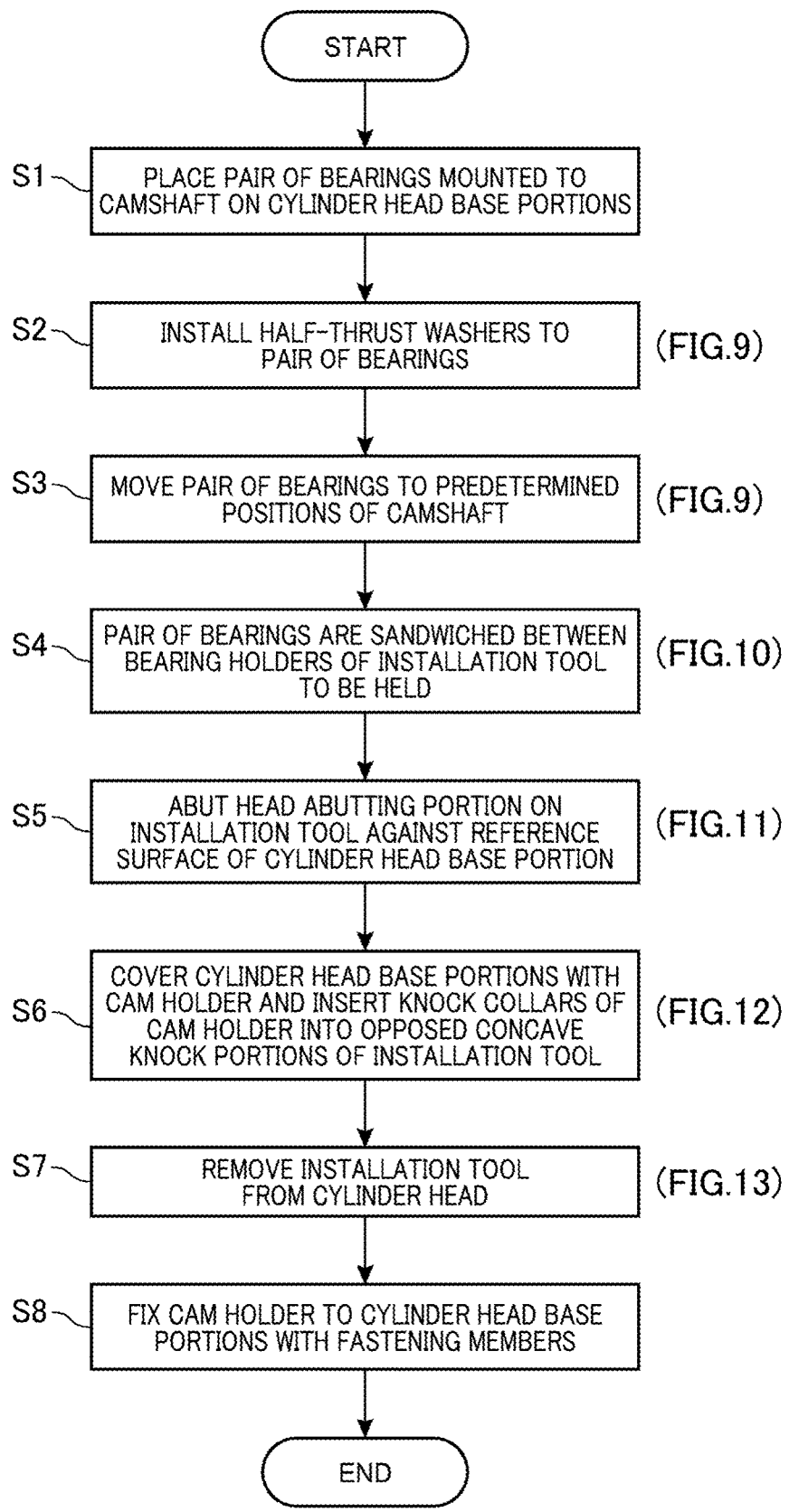

INSTALLATION TOOL, INTERNAL COMBUSTION ENGINE, AND METHOD FOR INSTALLING CAMSHAFT

INCORPORATION BY REFERENCE

The present application claims priority under 35 U.S.C. § 119 to Japanese Patent Application No. 2018-158651 filed on Aug. 27, 2018. The content of the application is incorporated herein by reference in its entirety.

TECHNICAL FIELD

The present invention relates to an installation tool, an internal combustion engine, and a method for installing a camshaft.

BACKGROUND ART

There has been conventionally known an installation tool to install a semi-circular member to a journal tray portion of a cylinder block without misassembly while an oil groove disposed in one surface of the semi-circular member is confirmed considering an oil passage around a crankshaft (for example, see Patent Literature 1).

CITATION LIST

Patent Literature

[Patent Literature 1] Japanese Patent No. 5509238

SUMMARY OF INVENTION

Technical Problem

Some internal combustion engines include semi-circular members around camshafts. When the camshaft sandwiched by a cam holder is installed to a base portion of a cylinder head, to position a bearing supporting the camshaft in an axis direction, the semi-circular member needs to be inserted into concave portions disposed in the respective bearing and cam holder. However, when the bearing to which the semi-circular member is installed is covered with the cam holder and the concave portion in the cam holder is adjusted to the semi-circular member, since the semi-circular member is covered with the cam holder from the above, seeing the semi-circular member is difficult, and therefore a work relied on a hunch of a worker.

Therefore, an installation tool and a camshaft installation method using the installation tool that can improve an assembling property of the camshaft to the cylinder head base portion without relying on the hunch of the worker in a situation of poor visibility have been requested.

An object of the present invention is to provide an installation tool and a camshaft installation method that ensure improving an assembling property of a camshaft.

Solution to Problem

An installation tool is for installing a camshaft (61) to a cylinder head base portion (66) of a cylinder head (53) of an internal combustion engine (50). The cylinder head (53) includes the cylinder head base portion (66), a cam holder (67), and a semi-circular member (97). The camshaft (61) is sandwiched between the cam holder (67) and the cylinder head base portion (66) via a bearing (62). The semi-circular member (97) is inserted into respective bearing side concave portion (62c) disposed in an outer peripheral surface of the bearing (62) and holder side concave portion (123d) disposed in the cam holder (67). The installation tool includes a bearing holder (16x, 16y), a head abutting portion (18), and a tool concave portion (17). The bearing holder (16x, 16y) holds the bearing (62). The head abutting portion (18) is abutted against a reference surface (66c) of the cylinder head base portion (66) with the bearing (62) held. Into the tool concave portion (17), a knock member (121) disposed in the cam holder (67) is inserted to adjust a position of the holder side concave portion (123d) with respect to the semi-circular member (97).

In the above-described configuration, a handle (12) may be disposed so as to extend in a direction different from a projecting direction of the head abutting portion (18).

In the above-described configuration, a notch section (19) may be disposed on an edge portion (23) on a side opposite to an edge portion (22) facing the camshaft (61). The notch section (19) avoids interference with a coupling component (85). The coupling component (85) couples an intake component (78) to the cylinder head (53).

In the above-described configuration, the bearing holder (16x, 16y) may have a curved surface (16c) on a distal end portion.

In the above-described configuration, a pair of the bearing holders (16x, 16y) may be disposed. The pair of bearings (62) are disposed on both sides of a cam (91, 92) provided in the camshaft (61) and covered with the integrated cam holder (67) from an above. The pair of bearings (62) are sandwiched between the bearing holders (16x, 16y) to be held.

In the above-described configuration, the tool concave portion (17) may be a part into which the knock member (121) is inserted. The knock member (121) is fitted to a knock hole (120a) disposed in the cylinder head base portion (66) to position the cam holder (67) with respect to the cylinder head base portion (66).

In the above-described configuration, the head abutting portion (18) may project downward from a root portion of one of the pair of bearing holders (16x, 16y) and may be abutted against an end portion of the cylinder head base portion (66) on a side opposite to a cam sprocket (94). The cam sprocket (94) is mounted to one end of the camshaft (61). The tool concave portion (17) has an opening (21). The opening (21) opens to a projection direction of the bearing holder (16x, 16y). The tool concave portion (17) has a curved surface (17d) having an arc shape in cross section configured to abut on the cylindrical knock member (121) as an end portion on a side opposite to the opening (21).

In the above-described configuration, an inclined surface (26x, 26y) that gradually lowers toward a projection direction of the bearing holder (16x, 16y) may be formed at a peripheral area of the tool concave portion (17). The bearing holder (16x, 16y) may have an inclined top surface (16b) continuous with the inclined surface (26x, 26y).

In the above-described configuration, a pair of the inclined surfaces (26x, 26y) may be formed independently so as to face a pair of sidewalls (125x, 125y). The pair of sidewalls (125x, 125y) are formed on the cam holder (67) and configured to abut on the cylinder head base portion (66).

An internal combustion engine includes a cylinder head (53) that includes a cylinder head base portion (66), a cam holder (67), a positioning member (97), and a knock member (121). The cam holder (67) sandwiches a camshaft (61) with the cylinder head base portion (66) via a bearing (62).

The positioning member (97) is inserted into respective bearing side concave portion (62c) disposed in an outer peripheral surface of the bearing (62) and holder side concave portion (123d) disposed in the cam holder (67). The knock member (121) is disposed on the cam holder (67) to position the cam holder (67) with respect to the cylinder head base portion (66). The positioning member (97) is a semi-circular member configured by halving a circular, annular-shaped member. The cylinder head base portion (66) restricts an axial movement of the camshaft (61) via the bearing (62), the positioning member (97), and the cam holder (67).

A camshaft installation method installs a camshaft (61) to a cylinder head base portion (66) of a cylinder head (53) in an internal combustion engine (50) using an installation tool (10). The cylinder head (53) includes the cylinder head base portion (66) and a cam holder (67) sandwiching the camshaft (61) with the cylinder head base portion (66) via a bearing (62). The camshaft installation method includes: a step of locating the bearing (62) mounted to the camshaft (61) to the cylinder head base portion (66); a step of inserting a semi-circular member (97) into a bearing side concave portion (62c) disposed in an outer peripheral surface of the bearing (62); a step of holding the bearing (62) by a bearing holder (16x, 16y) disposed in the installation tool (10); a step of abutting a head abutting portion (18) disposed in the installation tool (10) against a reference surface (66c) disposed on one end portion of the cylinder head base portion (66) with the bearing (62) held to position the bearing (62) and the camshaft (61) with respect to the cylinder head base portion (66); a step of covering the cam holder (67) including a holder side concave portion (123d) into which the semi-circular member (97) is inserted over the cylinder head base portion (66) and inserting a knock member (121) disposed in the cam holder (67) into a tool concave portion (17) disposed in the installation tool (10) to position the cam holder (67) with respect to the installation tool (10), so as to adjust a position of the holder side concave portion (123d) with respect to the semi-circular member (97); a step of removing the installation tool (10) from the cylinder head (53); and a step of fixing the cam holder (67) to the cylinder head base portion (66).

Advantageous Effects of Invention

The installation tool includes the bearing holder, the head abutting portion, and the tool concave portion. The bearing holder holds the bearing. The head abutting portion is abutted against the reference surface of the cylinder head base portion with the bearing held. Into the tool concave portion, the knock member disposed in the cam holder is inserted to adjust the position of the holder side concave portion with respect to the semi-circular member. Therefore, even in poor visibility, the cam holder can be located at the predetermined position without relying on the hunch of the worker. This allows easily adjusting the position of the holder side concave portion with respect to the semi-circular member and inserting the semi-circular member into the holder side concave portion, thereby ensuring improving the assembling property of the camshaft to the cylinder head base portion.

In the above-described configuration, the handle is disposed so as to extend in the direction different from the projecting direction of the head abutting portion. This allows the head abutting portion of the installation tool to abut on the cylinder head base portion with the handle on the upper portion of the installation tool gripped, and allows improving working efficiency.

In the above-described configuration, the notch section is disposed on the edge portion on the side opposite to the edge portion facing the camshaft. The notch section avoids the interference with the coupling component. The coupling component couples the intake component to the cylinder head. Accordingly, the notch section allows preventing the installation tool from interfering with the coupling component and also allows improving assembling workability.

In the above-described configuration, the bearing holder has the curved surface on the distal end portion. Accordingly, when the installation tool is removed from between the cylinder head base portion, the cam holder, and the coupling component, the installation tool can be less likely to interfere with the cylinder head base portion and the cam holder, thus ensuring improving the assembling workability.

In the above-described configuration, the pair of bearing holders are disposed. The pair of bearings are disposed on both sides of the cam provided in the camshaft and covered with the integrated cam holder from an above. The pair of bearings are sandwiched between the bearing holders to be held. Accordingly, even without dividing the cam holder covering the pair of bearings, the assembling property of the camshaft can be improved with the use of the integrated cam holder.

In the above-described configuration, the tool concave portion is the part into which the knock member is inserted. The knock member is fitted to the knock hole disposed in the cylinder head base portion to position the cam holder with respect to the cylinder head base portion. Accordingly, removing the installation tool with the cam holder positioned by the tool concave portion facilitates the insertion of the knock member into the holder side concave portion and ensures easily positioning and fixing the cam holder to the cylinder head base portion.

In the above-described configuration, the head abutting portion projects downward from the root portion of one of the pair of bearing holders and is abutted against the end portion of the cylinder head base portion on the side opposite to the cam sprocket. The cam sprocket is mounted to the one end of the camshaft. The tool concave portion has the opening. The opening opens to the projection direction of the bearing holder. The tool concave portion has the curved surface having the arc shape in cross section configured to abut on the cylindrical knock member as the end portion on the side opposite to the opening. Accordingly, the head abutting portion is abutted against the end portion of the cylinder head base portion on the side opposite to the cam sprocket side mounted to the one end of the camshaft; therefore, the cam sprocket does not become hindrance in the use of the installation tool. This allows easily positioning the installation tool to the cylinder head base portion. Additionally, the end portion of the tool concave portion on the side opposite to the opening is formed into the curved surface having the arc shape in cross section. Therefore, causing the tubular knock member to abut on the end portion formed into the curved surface having the arc shape in cross section allows automatically aligning the knock member with respect to the tool concave portion and the cam holder can be accurately positioned to the installation tool.

In the above-described configuration, the inclined surface that gradually lowers toward the projection direction of the bearing holder is formed at the peripheral area of the tool concave portion. The bearing holder has the inclined top surface continuous with the inclined surface. Accordingly, when the camshaft and the bearing are covered with the cam holder, a space can be secured between the installation tool and the cam holder. Thus, the installation tool can be easily removed from between the cylinder head base portion and the cam holder.

In the above-described configuration, the pair of inclined surfaces are formed independently so as to face the pair of sidewalls. The pair of sidewalls are formed on the cam holder and configured to abut on the cylinder head base portion. By independently forming the pair of inclined surfaces, when the cam holder is located above the installation tool, the space between the cam holder and the installation tool can be easily secured, and the inclined surface can be easily formed compared with continuous formation of one inclined surface.

In the internal combustion engine, the positioning member is the semi-circular member configured by halving the circular, annular-shaped member. The cylinder head base portion restricts the axial movement of the camshaft via the bearing, the positioning member, and the cam holder. With this configuration, while the axial movement of the camshaft is possibly restricted by the cylinder head base portion via the positioning member and the bearing, this internal combustion engine positions the camshaft to the cylinder head base portion via the bearing, the positioning member, and the cam holder to restrict the axial movement of the camshaft. This eliminates the need for forming the concave portion into which the positioning member is inserted in the cylinder head base portion, ensures reduction in machining man-hour for the cylinder head base portion, and ensures reduction in cost of the cylinder head. To install the camshaft to the cylinder head base portion, positioning the camshaft, the bearing, and the cam holder with respect to the cylinder head base portion with the use of the installation tool allows effectively installing the camshaft.

A camshaft installation method includes: a step of locating the bearing mounted to the camshaft to the cylinder head base portion; a step of inserting the semi-circular member into the bearing side concave portion disposed in the outer peripheral surface of the bearing; a step of holding the bearing by the bearing holder disposed in the installation tool; a step of abutting the head abutting portion disposed in the installation tool against the reference surface disposed on the one end portion of the cylinder head base portion with the bearing held to position the bearing and the camshaft with respect to the cylinder head base portion; a step of covering the cam holder including the holder side concave portion into which the semi-circular member is inserted over the cylinder head base portion and inserting the knock member disposed in the cam holder into the tool concave portion disposed in the installation tool to position the cam holder with respect to the installation tool, so as to adjust the position of the holder side concave portion with respect to the semi-circular member; a step of removing the installation tool from the cylinder head; and a step of fixing the cam holder to the cylinder head base portion. Therefore, even in poor visibility, the cam holder can be located at the predetermined position without relying on the hunch of the worker. This allows easily adjusting the position of the holder side concave portion with respect to the semi-circular member and inserting the semi-circular member into the holder side concave portion, thereby ensuring improving the assembling property of the camshaft to the cylinder head base portion.

BRIEF DESCRIPTION OF DRAWINGS

FIG. 20 is a front view illustrating the installation tool.

FIG. 21 is a flowchart depicting a crankshaft installation method.

DESCRIPTION OF EMBODIMENTS

The following describes one embodiment of the present invention with reference to the drawings. In the description, descriptions on directions such as front and rear, right and left, and upper and lower are identical to directions with respect to an internal combustion engine insofar as descriptions are not particularly given. A reference sign FR shown in each drawing indicates a front side of the internal combustion engine, a reference sign UP indicates an upper side of the internal combustion engine, and a reference sign LH indicates a left side of the internal combustion engine.

Figure 1:
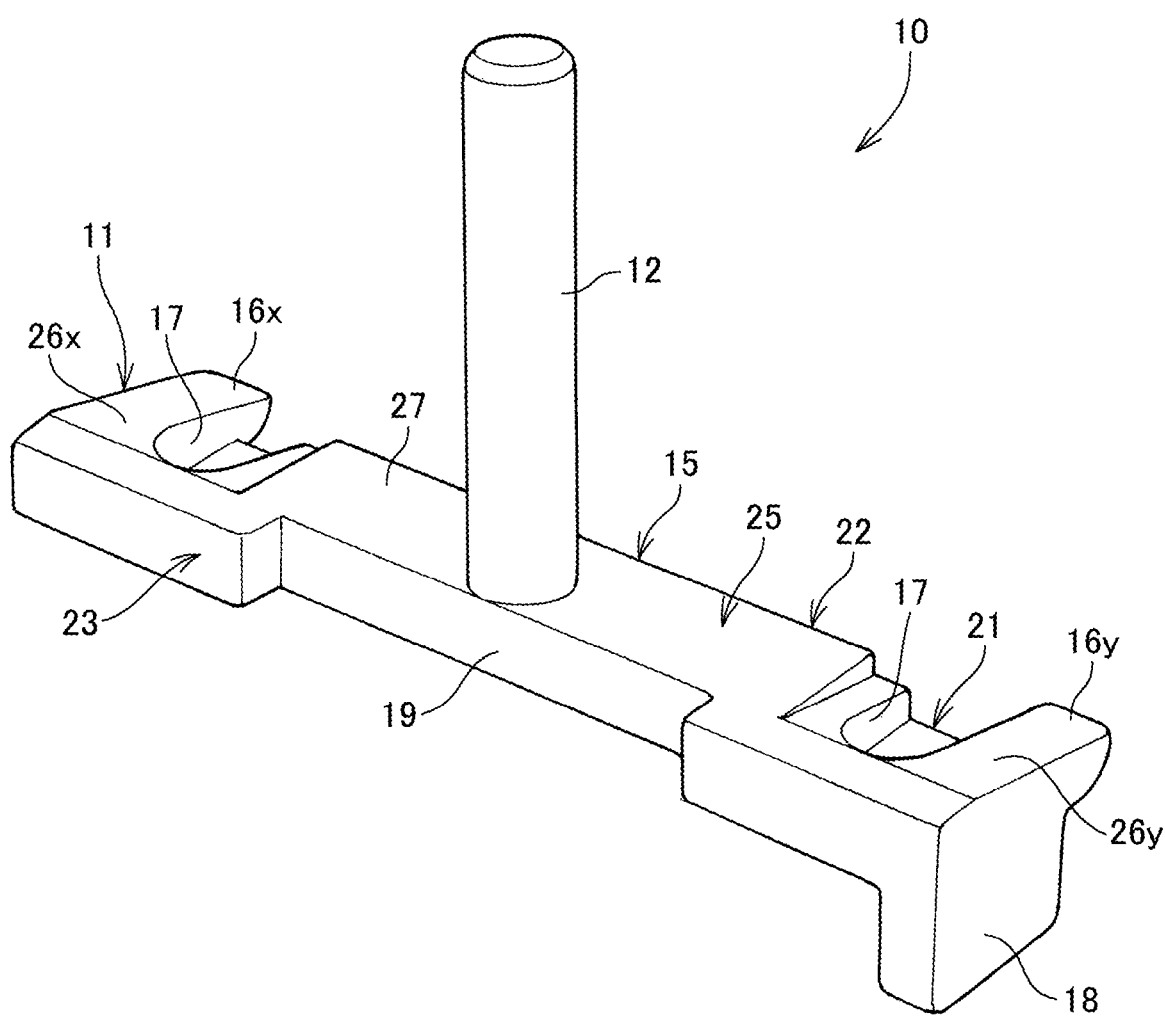
FIG. 1 is a perspective view illustrating an installation tool.

FIG. 1 is a perspective view illustrating an installation tool 10.

The installation tool 10 is to install a camshaft when a cylinder head of an internal combustion engine 50 (see FIG. 2) is assembled.

The installation tool 10 includes a main body 11 and a rod-shaped handle 12 mounted to the center of the main body 11.

The main body 11 includes a flat plate-shaped tool base portion 15, a pair of bearing holders 16x, 16y, a pair of opposed concave knock portions 17, a head abutting portion 18, and a notch section 19.

The pair of bearing holders 16x, 16y project integrally from an edge portion 22 on one side of a tool base portion 15 in a width direction. The pair of opposed concave knock portions 17 have openings 21 formed on edge portions on one side of the tool base portion 15 in the width direction. The head abutting portion 18 projects downward from one end portion of the tool base portion 15 in a longitudinal direction. The notch section 19 is formed on an edge portion 23 on the other side of the tool base portion 15 in the width direction.

On a top surface 25 of the tool base portion 15, upper inclined surfaces 26x, 26y are formed on respective both end portions of the tool base portion 15 in the longitudinal direction. The upper inclined surfaces 26x, 26y are formed over peripheries of the pair of bearing holders 16x, 16y and the pair of opposed concave knock portions 17. The top surface 25 is formed of the pair of upper inclined surfaces 26x, 26y and a flat upper flat surface 27 other than the pair of upper inclined surfaces 26x, 26y. Distal end portion sides of the pair of bearing holders 16x, 16y in the upper inclined surfaces 26x, 26y are inclined with respect to the upper flat surface 27 so as to be lower than the edge portion 23 side on the other side in the width direction.

Figure 2:
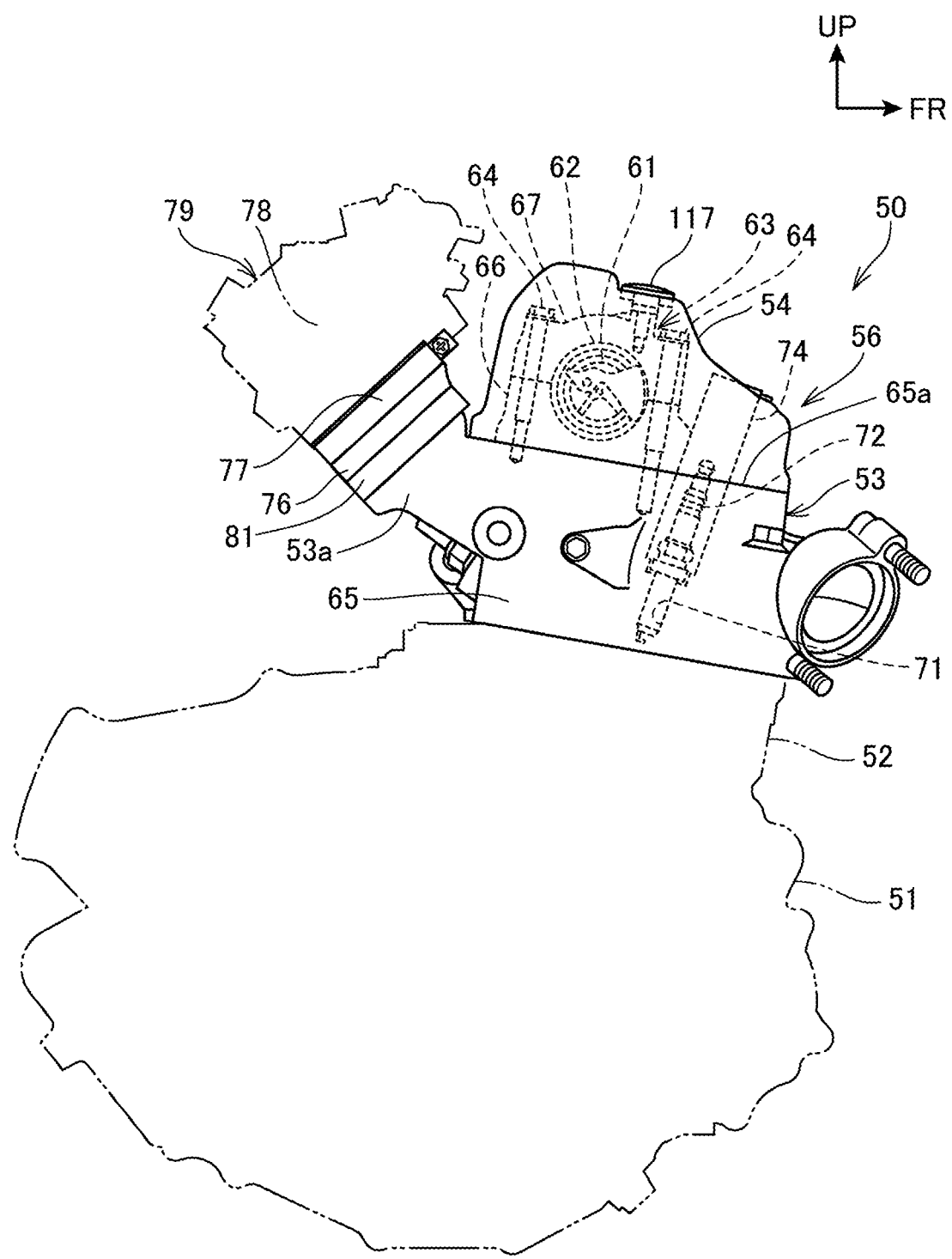
FIG. 2 is a right side view illustrating an internal combustion engine.

FIG. 2 is a right side view illustrating the internal combustion engine 50.

The internal combustion engine 50 includes a crankcase 51 housing a crankshaft, a cylinder block 52, a cylinder head 53, and a head cover 54 assembled to be stacked on the front upper portion of the crankcase 51 in order. The cylinder block 52, the cylinder head 53, and the head cover 54 constitute a cylinder unit 56.

The cylinder head 53 includes a camshaft 61 and a cam supporting portion 63 that rotatably supports the camshaft 61 via bearings 62.

The cam supporting portion 63 is configured of lower supporting portions 66 and a cam holder 67.

The lower supporting portions 66 are disposed integrally with a head body 65, which is manufactured by casting and constitutes a part of the cylinder head 53, so as to project upward with respect to a mating face 65a of the head body 65 with the head cover 54. The cam holder 67 is fixed to the upper end portions of the lower supporting portions 66 with a plurality of bolts 64.

Bearings 62 are sandwiched and fixed between the lower supporting portions 66 and the cam holder 67. The head body 65 includes a plug screw hole 71 communicating with a combustion chamber, and a spark plug 72 is screwed with the plug screw hole 71. The spark plug 72 is screwed into the plug screw hole 71 through a hollow portion of a tubular member 74 mounted to the head body 65.

To an intake air pipe 53a, which is disposed on the rear surface of the cylinder head 53, a throttle body 78 is coupled with an insulator 76 and an insulator band 77. The insulator 76 is mounted to the end portion of the intake air pipe 53a with an insulator band 81.

To the rear end portion of the throttle body 78, an air cleaner (not illustrated) is coupled via a coupling tube (not illustrated). The throttle body 78, the coupling tube, and the air cleaner constitute an intake device 79.

Figure 3:
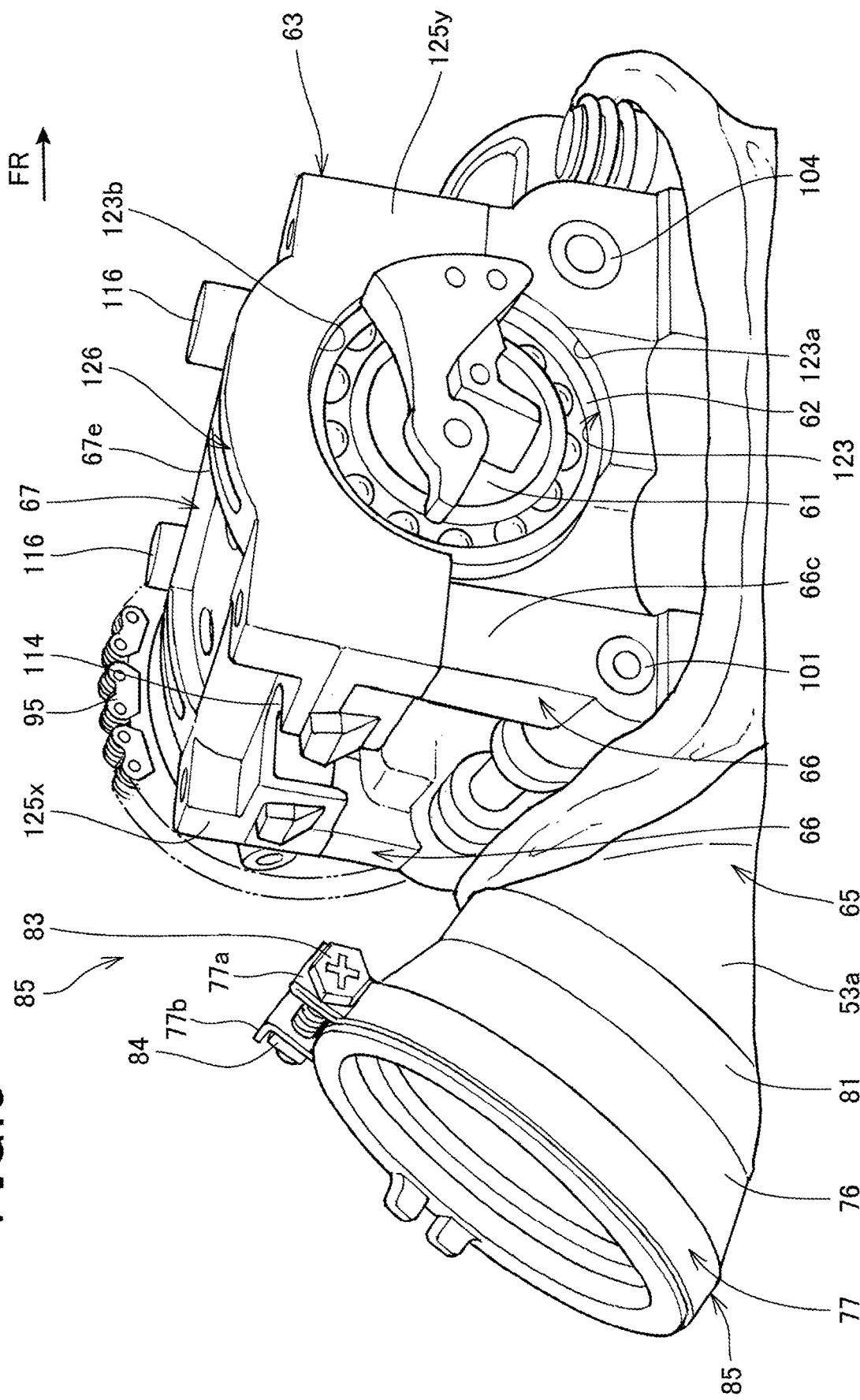
FIG. 3 is a perspective view illustrating a cylinder head.

FIG. 3 is a perspective view illustrating the cylinder head 53.

The cam holder 67 is fastened to the upper end portions of the lower supporting portions 66 formed on the head body 65 with the plurality of bolts 64 (see FIG. 2). The bolts 64 are removed in the drawing.

The pair of bearings 62 (only one bearing 62 is illustrated) are mounted to the camshaft 61, and the pair of bearings 62 are sandwiched and fixed between the lower supporting portions 66 and the cam holder 67.

The insulator 76 mounted to the intake air pipe 53a of the head body 65 is located at the rear of the cam supporting portion 63. The insulator 76 is mounted to the intake air pipe 53a with the insulator band 81. The insulator band 81 has both end portions located on the rear of the intake air pipe 53a.

Additionally, the insulator band 77 is fitted to the outer peripheral portion of the distal end portion of the insulator 76. The insulator band 77 has both end portions (end portions 77a, 77b) located on the upper side of the insulator 76 and is fastened with a bolt 83 and a nut 84.

The insulator band 81 also has both end portions fastened with the bolt 83 and the nut 84.

The insulator 76, the insulator band 77, 81, the bolt 83, and the nut 84 constitute a coupling component 85.

Figure 4:
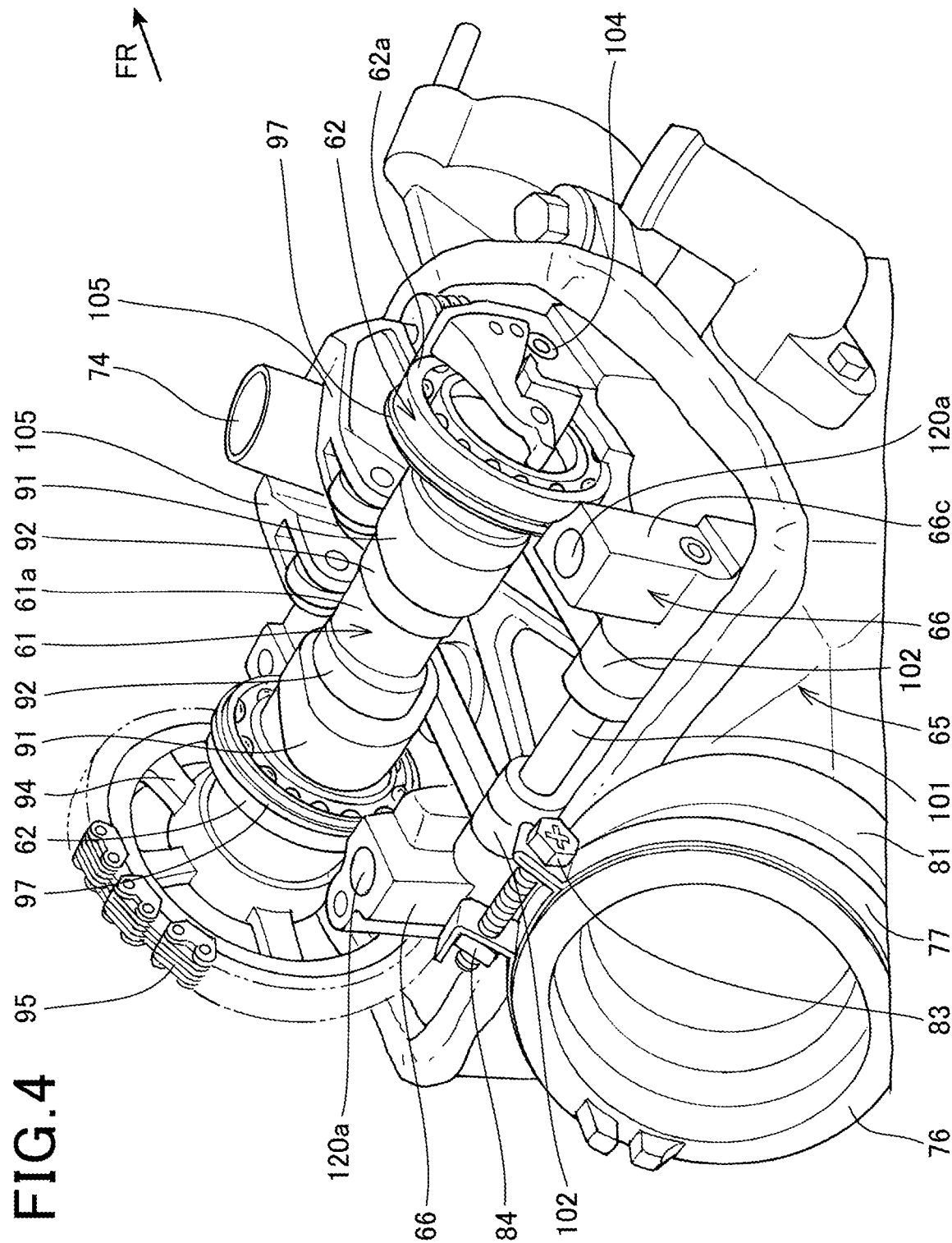
FIG. 4 is a perspective view illustrating a state where a cam holder is removed from a state of FIG. 3.

FIG. 4 is a perspective view illustrating a state where the cam holder 67 is removed from the state of FIG. 3.

The camshaft 61 integrally includes a pair of intake cams 91 and a pair of exhaust cams 92, which are located between the pair of intake cams 91, on an outer peripheral surface 61a. The pair of bearings 62 are fitted to the outer peripheral surface 61a outside (both end sides of the camshaft 61) the pair of intake cams 91. A cam sprocket 94 is fixed to an end portion on one side (the left side of the drawing) of the camshaft 61. A cam chain 95 is bridged over the cam sprocket 94 and a sprocket (not illustrated) fixed to the crankshaft.

The head body 65 includes the pair of right and left lower supporting portions 66, and the respective bearings 62 are fitted to inner peripheral surfaces of concave portions having a semi-arc shape in cross section formed on the right and left lower supporting portions 66.

The respective bearings 62 include annular grooves 62c (see FIG. 5) on outer peripheral surfaces of outer races 62a, and half-thrust washers 97 formed by halving a ring-shaped thrust washer is fitted to the annular grooves 62c. Since the half-thrust washers 97 are also fitted to half annular grooves 123d (see FIG. 8) formed on the cam holder 67, mounting the cam holder 67 (see FIG. 3) to the right and left lower supporting portions 66 of the head body 65 positions the pair of bearings 62 to the cam supporting portion 63 (see FIG. 3).

An intake rocker shaft 101 is passed over the respective rear portions of the right and left lower supporting portions 66, and a pair of right and left intake rocker arms 102 are swingably supported to the intake rocker shaft 101. Intake bulbs (not illustrated) are located underneath the distal end portions of the respective intake rocker arms 102, and the right and left intake bulbs are driven to the right and left intake cams 91 via the distal end portions of the intake rocker arms 102.

An exhaust rocker shaft 104 is passed over the respective front portions of the right and left lower supporting portions 66, and a pair of right and left exhaust rocker arms 105 are swingably supported to the exhaust rocker shaft 104. Respective exhaust bulbs (not illustrated) are located underneath the right and left exhaust rocker arms 105. The right and left exhaust bulbs are driven to the right and left exhaust cams 92 via the exhaust rocker arms 105.

Figure 5:
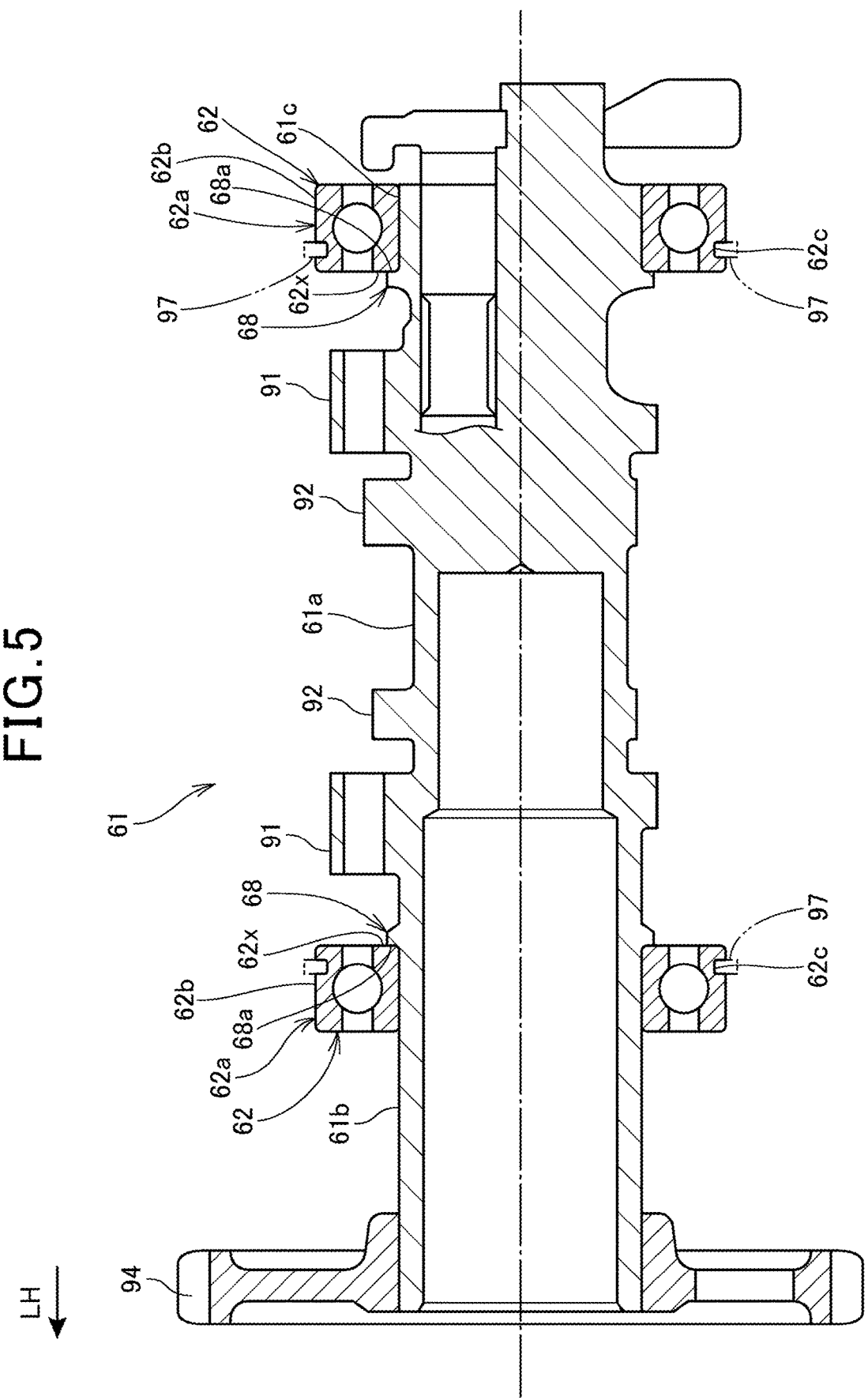
FIG. 5 is a cross-sectional view illustrating a vertical cross-sectional surface of a camshaft.

FIG. 5 is a cross-sectional view illustrating the vertical cross-sectional surface of the camshaft 61.

The camshaft 61 integrally includes a pair of annular extruding portions 68 located outside the pair of intake cams 91 (both end portion sides of the camshaft 61) on the outer peripheral surface 61a.

The pair of bearings 62 are fitted to bearing fitting surfaces 61b, 61c formed on the outer peripheral surface 61a to be axially movable. The respective bearings 62 have inner end surfaces 62x pressed against outer end surfaces 68a (end surfaces on both ends sides of the camshaft 61) of the respective annular extruding portions 68 of the camshaft 61, thus positioning the right and left bearings 62 to the camshaft 61.

The annular grooves 62c are formed on outer peripheral surfaces 62b of the outer races 62a of the respective bearings 62, and the half-thrust washers 97 are inserted into the annular grooves 62c. The annular grooves 62c are disposed close to one end surfaces (close to the annular extruding portions 68) with respect to the center of the bearings 62 in the width direction.

Figure 6:
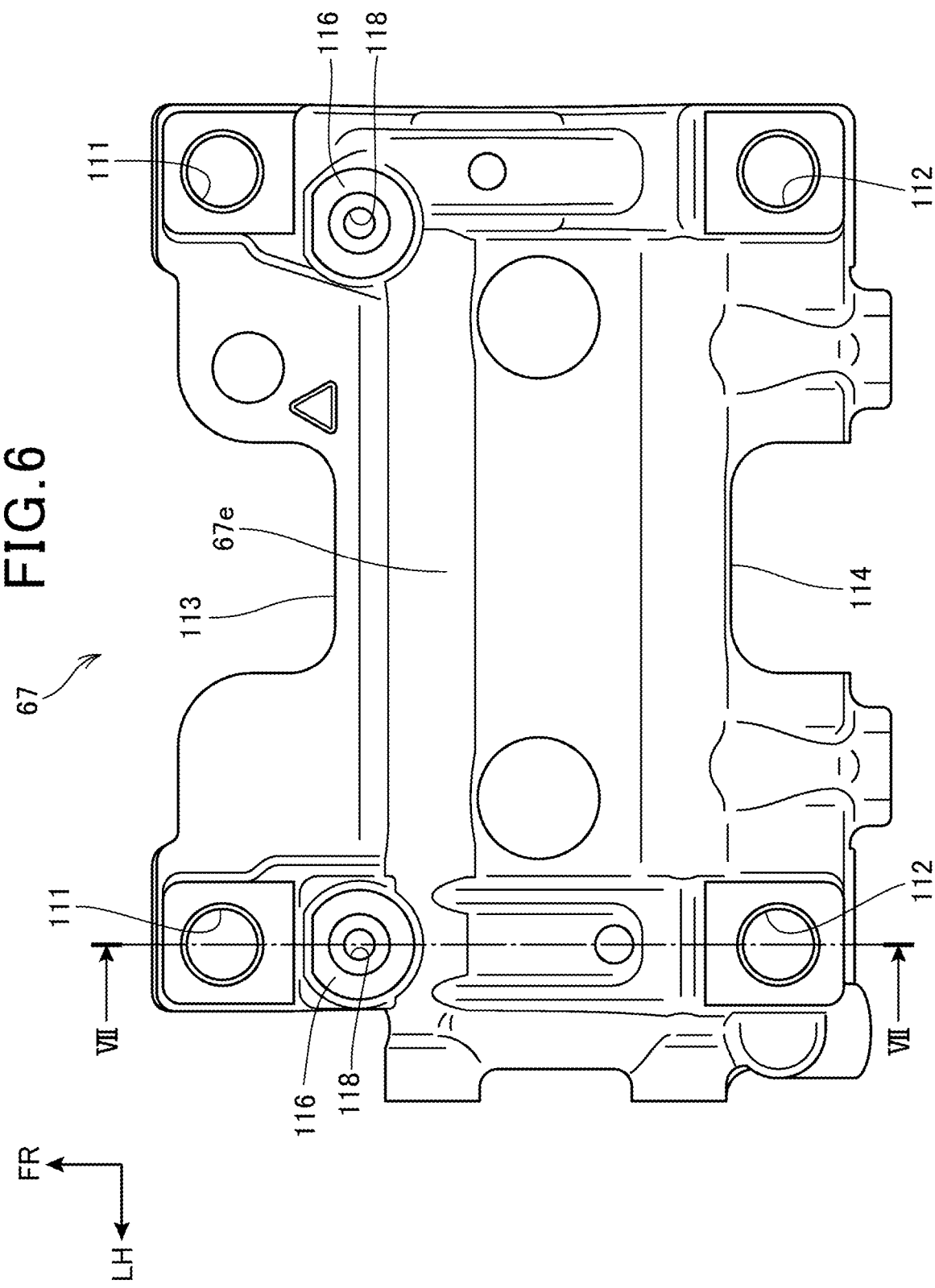
FIG. 6 is a plan view illustrating the cam holder.

FIG. 6 is a plan view illustrating the cam holder 67.

Bolt insertion holes 111 are bored on respective two corner portions on the front side of the cam holder 67, and bolt insertion holes 112 are bored on respective two corner portions on the rear side of the cam holder 67. The cam holder 67 is fastened to the right and left lower supporting portions 66 (see FIG. 3) with the bolts 64 (see FIG. 2) inserted through the plurality of respective bolt insertion holes 111, 112.

A pair of right and left boss portions 116 projecting upward are formed integrally with a top surface 67e of the cam holder 67. The respective boss portions 116 have screw holes 118 into which bolts 117 (see FIG. 2) to fasten the head cover 54 (see FIG. 2) are screwed.

Cutouts 113, 114 are formed on respective front edge and rear edge of the cam holder 67.

Figure 7:
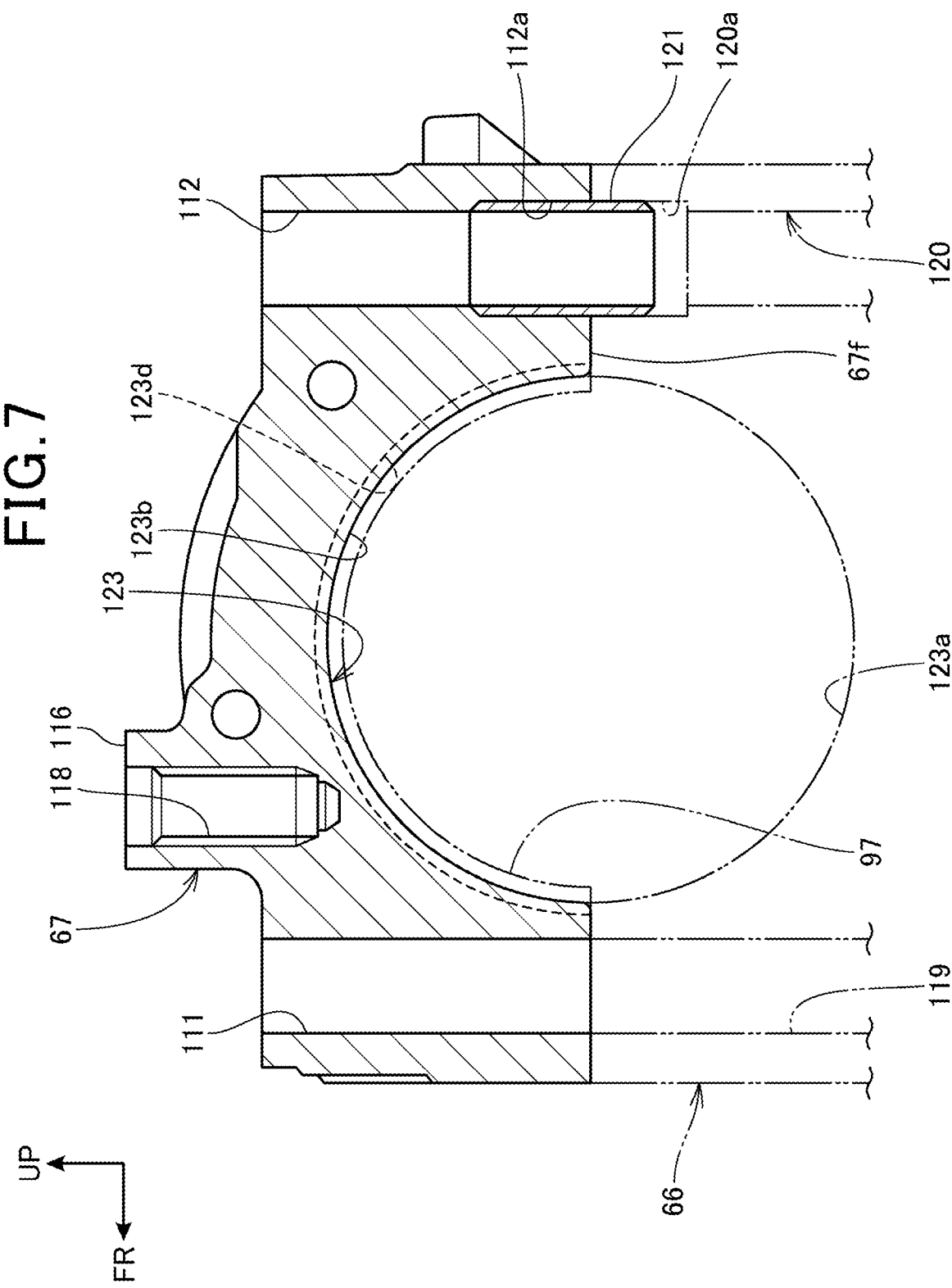
FIG. 7 is a cross-sectional view taken along the line VII-VII of FIG. 6.

FIG. 7 is a cross-sectional view taken along the line VII-VII of FIG. 6.

Note that FIG. 7 also illustrates the lower supporting portions 66 by two-dot chain lines.

Cylindrical knock collars 121 to position the cam holder 67 with respect to the lower supporting portions 66 are press-fitted to the lower portions of the bolt insertion holes 112 (only one bolt insertion hole 112 is illustrated) on the rear side of the cam holder 67. The knock collars 121 project from a lower surface 67f of the cam holder 67.

The bolt insertion holes 112 on the rear side include large diameter-holes 112a on the lower portions to which the knock collars 121 are press-fitted.

Between the bolt insertion holes 111, 112 on the front and rear of the cam holder 67 and between screw holes 119, 120 on the front and rear into which the bolts 64 (see FIG. 2) are screwed disposed in the lower supporting portions 66, bearing fitting holes 123 to which the bearings 62 (see FIG. 5) are fitted are formed.

The bearing fitting hole 123 is formed of a semicircular-shaped lower fitting portion 123a formed in the lower supporting portion 66 and a semicircular-shaped upper fitting portion 123b formed in the cam holder 67.

On the upper side of the screw hole 120, knock holes 120a to which the knock collars 121 are fitted are formed.

Figure 8:
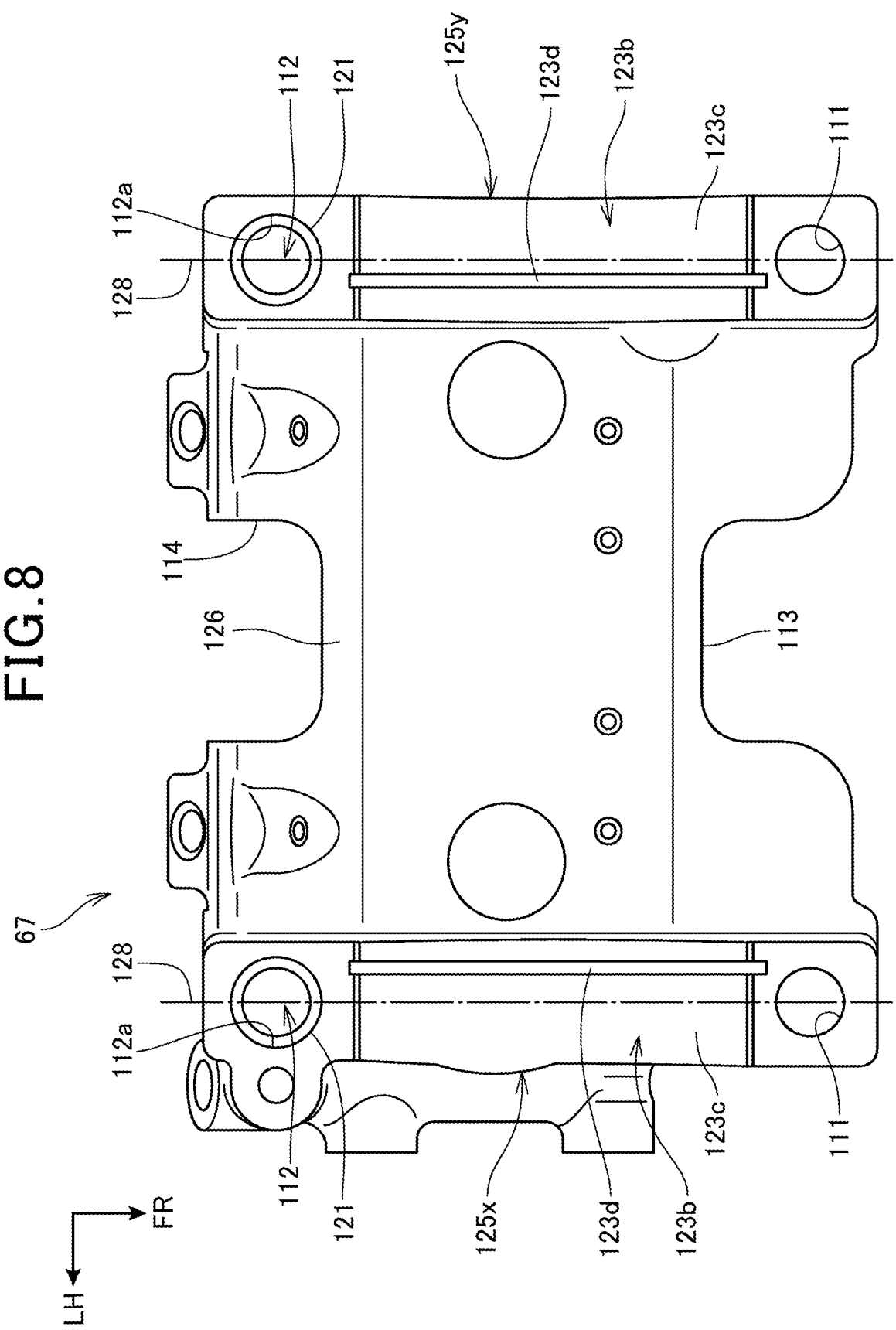
FIG. 8 is a bottom view illustrating the cam holder.

FIG. 8 is a bottom view illustrating the cam holder 67.

The cam holder 67 integrally includes a pair of right and left sidewalls 125x, 125y and an upper wall 126 coupling the right and left sidewalls 125x, 125y. The respective right and left sidewalls 125x, 125y include the pair of front and rear bolt insertion holes 111, 112 and the upper fitting portions 123b.

On inner peripheral surfaces 123c of the upper fitting portions 123b, half annular grooves 123d having a half annular shape into which the half-thrust washers 97 (see FIG. 4) are inserted are formed.

The half annular grooves 123d are formed along hole center lines 128 passing through the centers of the bolt insertion holes 111, 112 on the front and rear and are shifted to the center side of the cam holder 67 in the right-left direction with respect to the hole center line 128.

Note that, in FIG. 7, the lower fitting portion 123a (see FIG. 7) does not have the half annular groove like the above-described half annular groove 123d. That is, the right and left bearings 62 are not directly positioned by the right and left lower supporting portions 66 of the head body 65 (see FIG. 2).

Next, the following describes a point for installation of the camshaft 61 to the head body 65 of the cylinder head 53.

Figure 9:
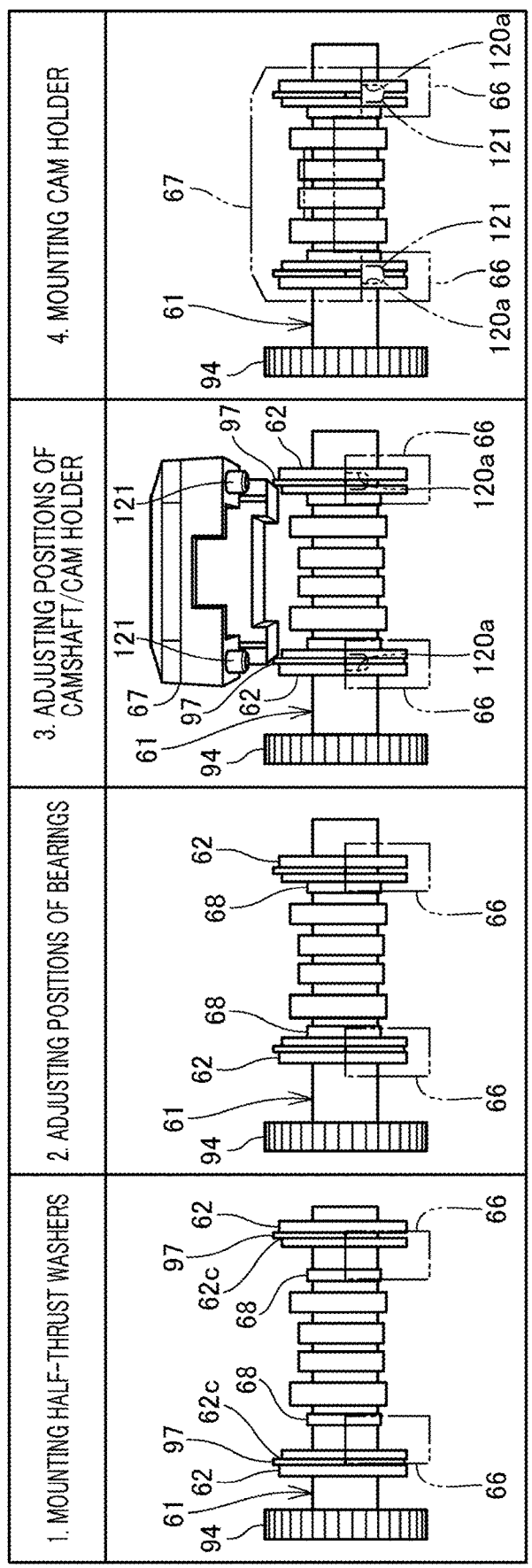
FIG. 9 is an explanatory view describing a point for installation of the camshaft.

FIG. 9 is an explanatory view describing the point for installation of the camshaft 61. Note that FIG. 9 schematically illustrates the camshaft 61 and peripheral members of the camshaft 61.

1. The half-thrust washers are mounted.

With the pair of bearings 62 mounted to the camshaft 61 placed on the lower supporting portions 66 (specifically, the right and left lower fitting portions 123a (see FIG. 7) of the lower supporting portions 66), the half-thrust washers 97 are inserted into the annular grooves 62c in the respective bearings 62.

2. The positions of the bearings are adjusted.

The pair of respective bearings 62 are pressed against the annular extruding portions 68 to adjust the positions of (to position) the pair of bearings 62 to the camshaft 61.

3. The positions of the camshaft and the cam holder are adjusted.

The camshaft 61 and the cam holder 67 are positioned with respect to the lower supporting portions 66. Specifically, the camshaft 61 is positioned with respect to the lower supporting portions 66 via the pair of bearings 62. Additionally, by fitting the half annular grooves 123d (see FIG. 7) of the cam holder 67 to the half-thrust washers 97 mounted to the pair of bearings 62, the cam holder 67 is positioned with respect to the camshaft 61.

4. The cam holder is mounted.

The lower supporting portions 66 and the camshaft 61 are covered with the cam holder 67, the pair of knock collars 121 of the cam holder 67 are fitted to the pair of knock holes 120a disposed in the lower supporting portions 66 to position the cam holder 67 with respect to the lower supporting portions 66. After that, the cam holder 67 is fastened to the lower supporting portions 66 with the plurality of bolts 64 (see FIG. 2).

Now the installation of the camshaft 61 is completed.

The above-described steps of the installation are performed using the installation tool 10 illustrated in FIG. 1. The following describes the point for installation using the installation tool 10.

Figure 10:
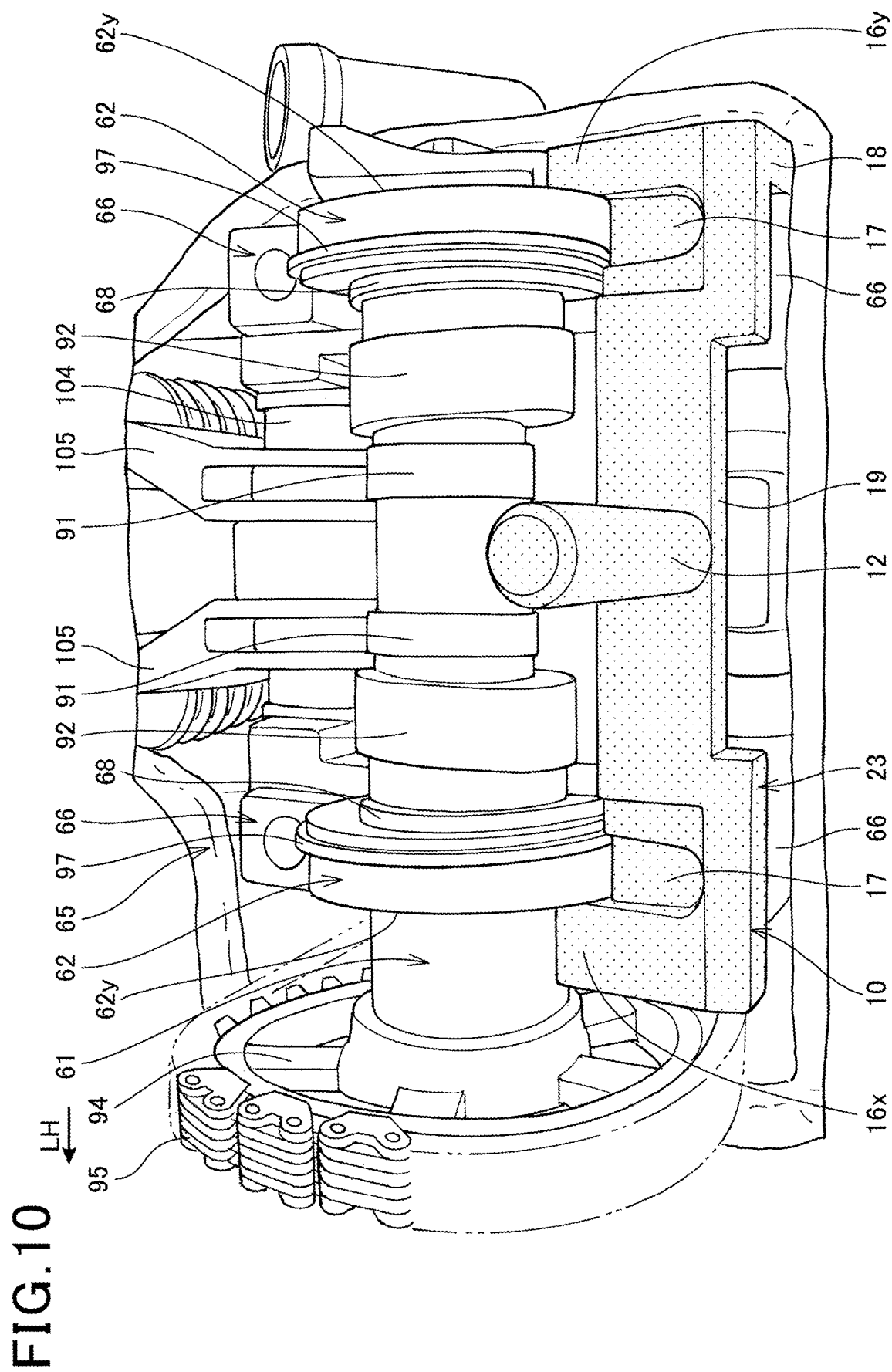
FIG. 10 is a first operation diagram illustrating the point for installation of the camshaft.
Figure 11:
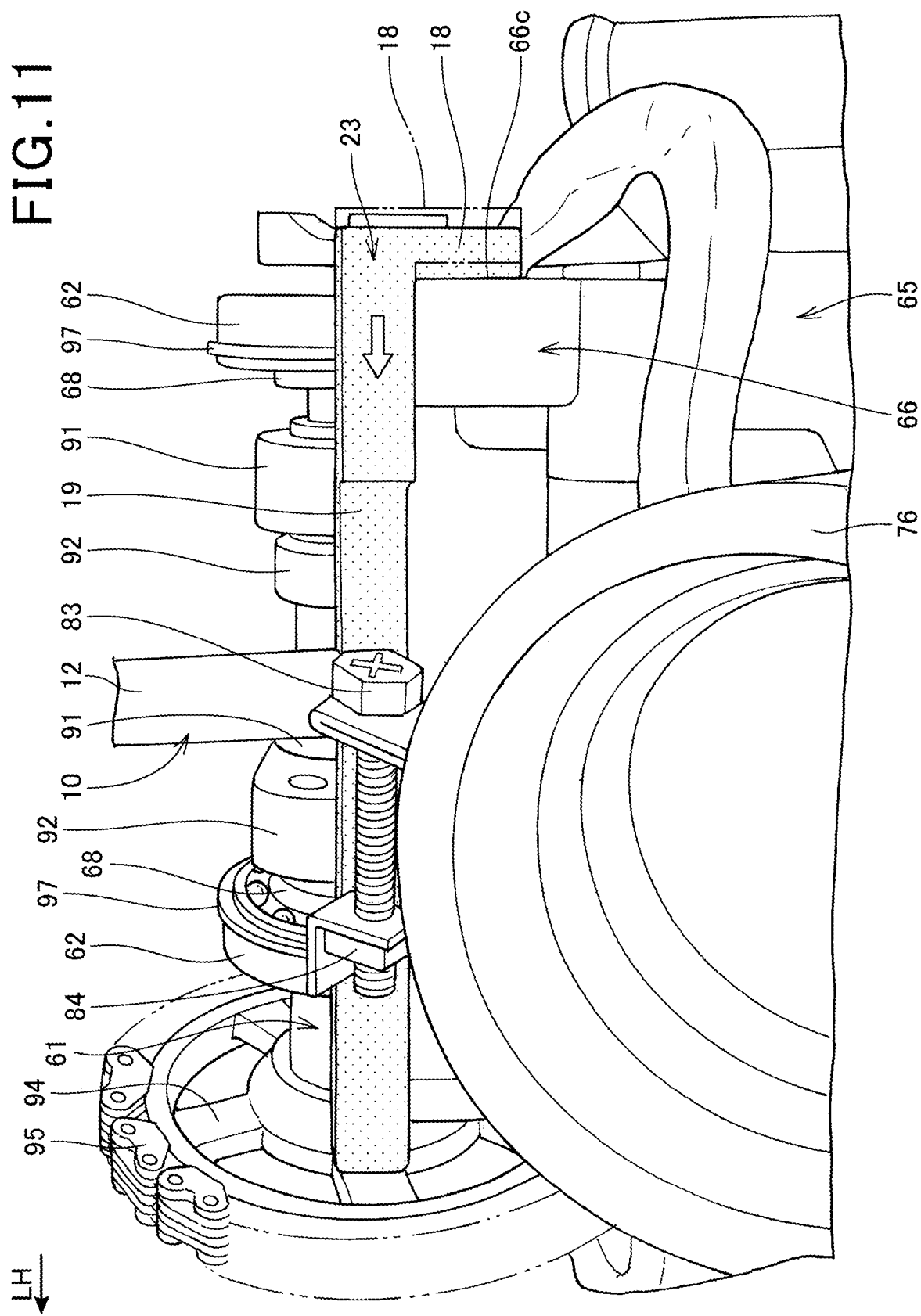
FIG. 11 is a second operation diagram illustrating the point for installation of the camshaft.

FIG. 10 is a first operation diagram illustrating the point for installation of the camshaft 61. FIG. 11 is a second operation diagram illustrating the point for installation of the camshaft 61.

As illustrated in FIG. 10, after the pair of respective bearings 62 are pressed against the annular extruding portions 68, the installation tool 10 is placed on the rear portions of the right and left lower supporting portions 66 of the head body 65 (positions rearward of the camshaft 61). Respective outer end surfaces 62y of the pair of bearings 62 are sandwiched by the pair of bearing holders 16x, 16y of the installation tool 10 in the axis direction of the camshaft 61.

As illustrated in FIG. 11, regarding the right and left lower supporting portions 66, a vertically extending reference surface 66c is formed on an end portion of one lower supporting portion 66 (an end portion of the lower supporting portion 66 on the right side). The cam chain 95 hung to the cam sprocket 94 is located near an end portion of the other lower supporting portion 66 (an end portion of the lower supporting portion 66 on the left side) in the right and left lower supporting portions 66. Therefore, the reference surface 66c is disposed on the end portion of the one lower supporting portion 66 (the end portion of the lower supporting portion 66 on the right side) to avoid the cam sprocket 94 and the cam chain 95 to be a hindrance in the use of the installation tool 10.

When the installation tool 10 is placed on the right and left lower supporting portions 66, as indicated by the two-dot chain line, the head abutting portion 18 of the installation tool 10 is located so as to be positioned slightly away from the reference surface 66c.

From this state, as indicated by the void arrow, the installation tool 10 is moved in the other direction (leftward) in the right-left direction until the head abutting portion 18 abuts on the reference surface 66c. When the head abutting portion 18 abuts on the reference surface 66c, the camshaft 61 including the pair of bearings 62 is positioned in the right-left direction with respect to the head body 65 (specifically, the lower supporting portions 66).

Figure 12:
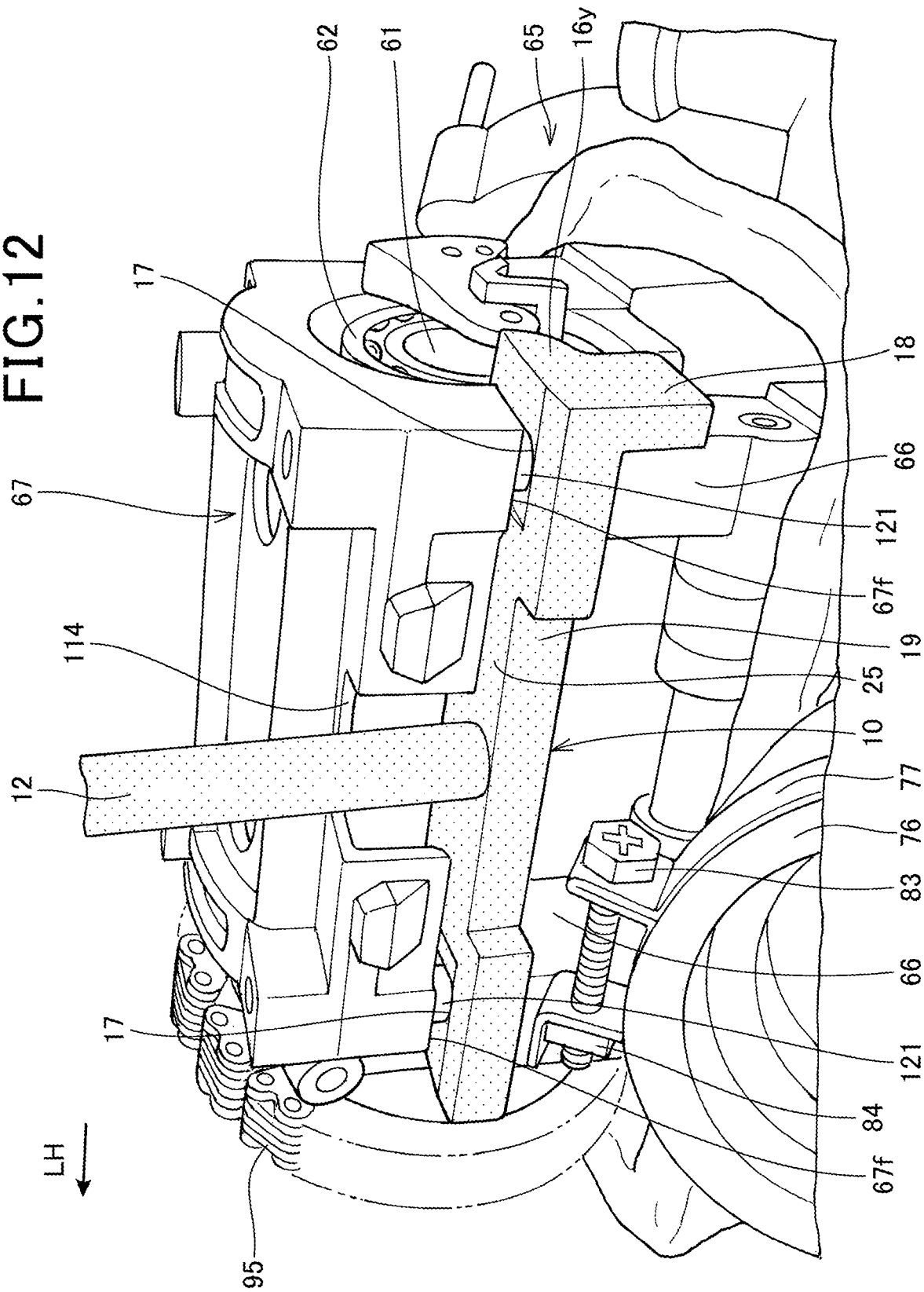
FIG. 12 is a third operation diagram illustrating the point for installation of the camshaft.

FIG. 12 is a third operation diagram illustrating the point for installation of the camshaft 61.

As illustrated in FIG. 12, from the state in FIG. 11, the cam holder 67 is covered over the camshaft 61 (see FIG. 11) including the pair of bearings 62, the lower supporting portions 66 (see FIG. 11), and the installation tool 10.

At this time, the right and left knock collars 121 of the cam holder 67 are inserted into the right and left opposed concave knock portions 17 (see FIG. 10) of the installation tool 10. The handle 12 on the installation tool 10 passes through the inside of the cutout 114 of the cam holder 67 and extends upward.

Since the lower end portions of the right and left knock collars 121 abut on the bottom surfaces of the right and left opposed concave knock portions 17, peripheral areas of the knock collars 121 on the lower surface 67f of the cam holder 67 are lifted from the top surface 25 of the installation tool 10.

The insertion of the right and left knock collars 121 into the right and left opposed concave knock portions 17 positions the cam holder 67 with respect to the installation tool 10. Since the installation tool 10 is positioned with respect to the head body 65 (specifically, the right and left lower supporting portions 66), the cam holder 67 is positioned with respect to the head body 65 in the right-left direction as a result.

Figure 13:
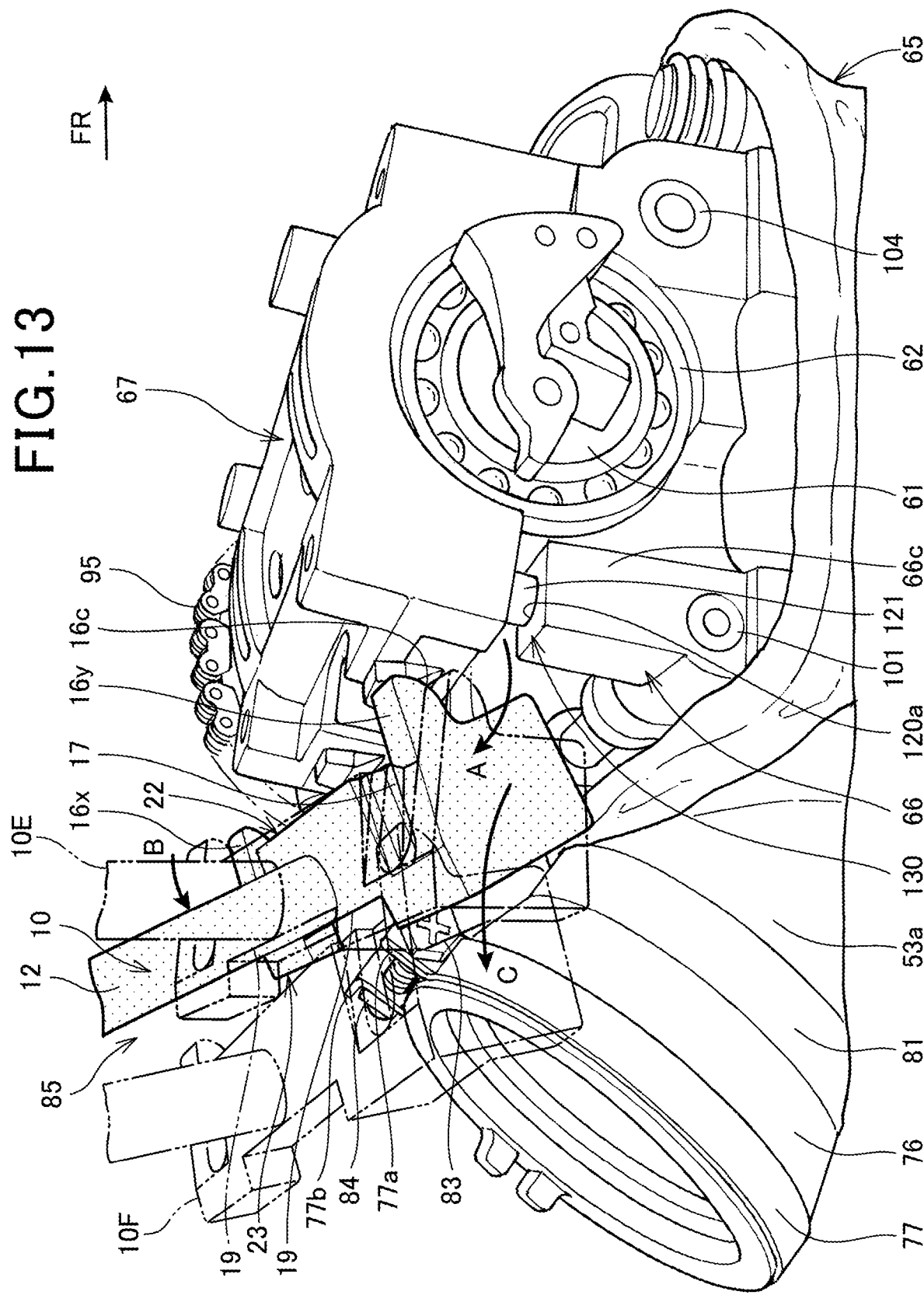
FIG. 13 is a fourth operation diagram illustrating the point for installation of the camshaft.

FIG. 13 is a fourth operation diagram illustrating the point for installation of the camshaft 61.

The installation tool 10 is removed from the lower supporting portions 66.

In detail, while the installation tool 10 is once moved rearward as indicated by the arrow A from the state placed on the right and left lower supporting portions 66, the installation tool 10 is pulled upward while laid down on the cam holder 67 side (a reference numeral 10E is given to the laid down installation tool for identification) using curved lower surfaces 16c of the bearing holders 16x, 16y. After that, while interference between the installation tool 10 and the insulator band 77, the bolt 83, and the nut 84 are avoided, as indicated by the arrow B, the handle 12 is inclined rearward to move up the bearing holders 16x, 16y. At this time, since the notch section 19 is disposed, the installation tool 10 can be biased to the insulator band 77 side, thereby allowing the bearing holders 16x, 16y to be less likely to interfere with the cam holder 67.

After the installation tool 10 is removed from the lower supporting portions 66, the knock collars 121 obliquely abut on inlets of the knock holes 120a, thus forming a space 130 between the lower supporting portions 66 and the cam holder 67.

Next, as indicated by the arrow C, the installation tool 10 (two-dot chain line) is moved above the insulator band 77, the bolt 83 (see FIG. 13), and the nut 84 (see FIG. 13) (a reference numeral 10F is given to the installation tool moved upward for identification) to terminate the movement of the installation tool 10.

After terminating the movement of the installation tool 10, an angle of the cam holder 67 in the front-rear direction is adjusted to fit the right and left knock collars 121 to the respective knock holes 120a. In view of this, as illustrated in FIG. 3, the lower surface of the cam holder 67 is matched with the top surfaces of the lower supporting portions 66, and the half annular grooves 123d (see FIG. 8) of the cam holder 67 are fitted to the half-thrust washers 97 (see FIG. 11) to position the cam holder 67 with respect to the right and left lower supporting portions 66.

After that, the cam holder 67 is fixed to the lower supporting portions 66 with the plurality of bolts 64 (see FIG. 2).

When necessary, after the installation tool 10 is removed from the lower supporting portions 66, the position and inclination of the cam holder 67 with respect to the lower supporting portions 66 are finely adjusted. This promotes the fitting of the half annular grooves 123d to the half-thrust washers 97 and the fitting of the right and left knock collars 121 to the right and left knock holes 120a.

Figure 14:
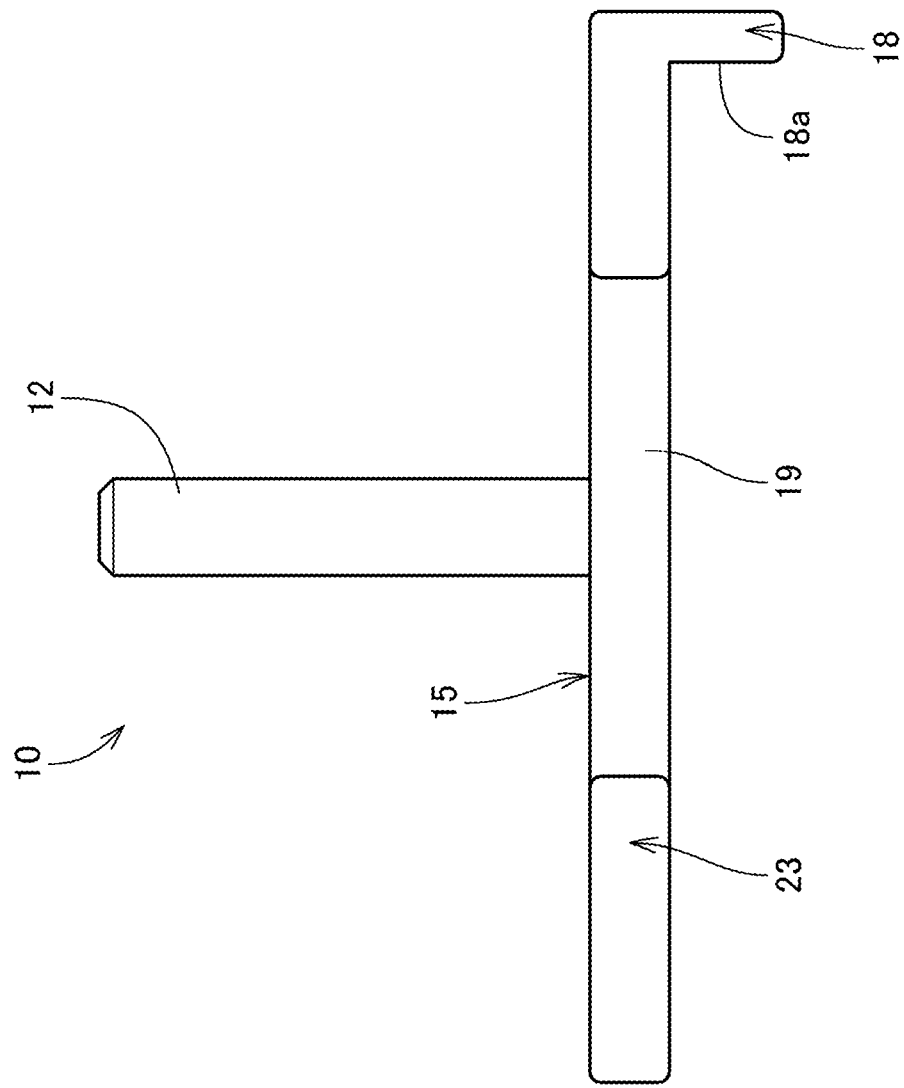
FIG. 14 is a back view illustrating the installation tool.
Figure 15:
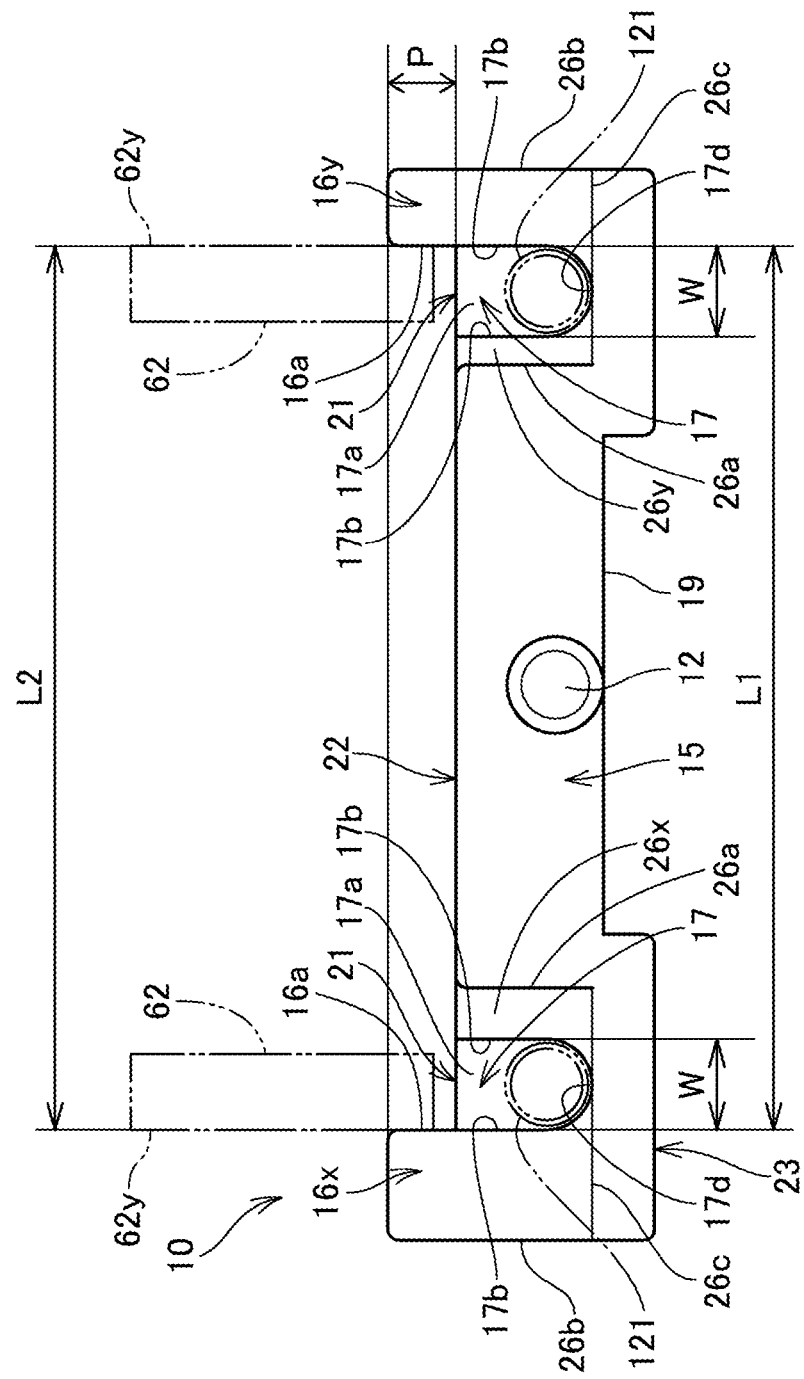
FIG. 15 is a plan view illustrating the installation tool.
Figure 16:
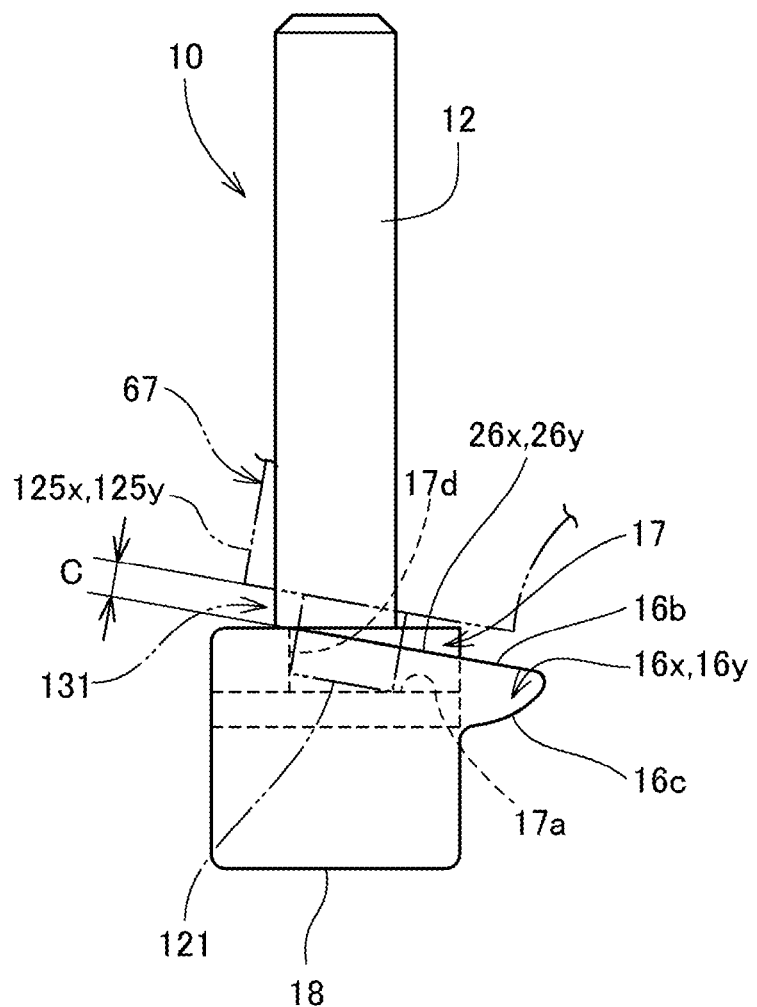
FIG. 16 is a side view illustrating the installation tool.

FIG. 14 is a back view illustrating the installation tool 10. FIG. 15 is a plan view illustrating the installation tool 10. FIG. 16 is a side view illustrating the installation tool 10 and additionally illustrating the cam holder 67 and the knock collars 121 by the two-dot chain lines.

As illustrated in FIG. 14, the head abutting portion 18 of the installation tool 10 is bent squarely downward with respect to the tool base portion 15.

The head abutting portion 18 is a part abutted against the reference surface 66c (see FIG. 4) of the lower supporting portion 66 (see FIG. 4).

Abutting the head abutting portion 18 against the reference surface 66c allows the installation tool 10 to be positioned with respect to the lower supporting portions 66 and further the pair of bearings 62 (see FIG. 4) and the camshaft 61 (see FIG. 4) to be positioned.

The notch section 19, which is formed on the edge portion 23 heading for the insulator 76 (see FIG. 12) in the tool base portion 15, is disposed to avoid interference with end portions 77a, 77b of the insulator band 77, the bolt 83, and the nut 84 illustrated in FIG. 3.

The handle 12 extends perpendicular or approximately perpendicular to the tool base portion 15.

As illustrated in FIG. 15, the right and left bearing holders 16x, 16y project by an amount of projection P with respect to the edge portion 22 of the tool base portion 15. The edge portion 22 is a part located toward the camshaft 61 (see FIG. 10).

The right and left bearing holders 16x, 16y each include an inner end surface 16a as a holding surface to hold the right and left bearings 62. Defining a distance between the right and left inner end surfaces 16a as L1, a distance L2 between the right and left bearings 62 (specifically, the outer end surfaces 62y) each pressed against the annular extruding portions 68 (see FIG. 10) is slightly smaller than the distance L1 (L2<L1). Therefore, the pair of bearings 62 can be sandwiched between the right and left bearing holders 16x, 16y to be held.

The opposed concave knock portion 17 includes a bottom surface 17a, right and left side surfaces 17b, 17b, and a rear surface 17d and has an opening 21 on its front side.

The bottom surfaces 17a are parts on which the knock collars 121 disposed on the cam holder 67 (see FIG. 13) are placed. The right and left side surfaces 17b, 17b are formed to be parallel or approximately parallel and each extend in the front-rear direction. The rear surface 17*d* is formed into an arc shape convexed from the right and left side surfaces 17*b*, 17*b* toward the edge portion 23 side.

Defining a width of the opposed concave knock portion 17 (a width between the right and left side surfaces 17*b*, 17*b*) as W, a curvature radius of the rear surface 17*d* becomes W/2. The width W is slightly larger than an outer diameter of the knock collar 121.

Bringing the right and left knock collars 121 into abutment with the right and left rear surfaces 17*d* of the opposed concave knock portions 17 with the installation tool 10 positioned with the lower supporting portions 66 (see FIG. 12), the right and left knock collars 121 are automatically aligned in the longitudinal direction of the tool base portion 15 (the axis direction of the camshaft 61 (see FIG. 10)) by the arc-shaped rear surfaces 17*d*. Consequently, the cam holder 67 is positioned with respect to the installation tool 10 in the right-left direction.

The right and left upper inclined surfaces 26*x*, 26*y* have respective inner edges 26*a* positioned on the handle 12 side with respect to the opposed concave knock portions 17, and outer edges 26*b* of the right and left upper inclined surfaces 26*x*, 26*y* match the end portions of the tool base portion 15. The right and left upper inclined surfaces 26*x*, 26*y* have rear edges 26*c* extending in the longitudinal direction of the tool base portion 15 close to the rear surfaces 17*d* of the opposed concave knock portions 17.

As illustrated in FIG. 16, top surfaces 16*b* of the right and left bearing holders 16*x*, 16*y* are formed into inclined surfaces inclined downwardly toward the front continuous with the upper inclined surfaces 26*x*, 26*y*. By thus disposing the upper inclined surfaces 26*x*, 26*y* and the top surfaces 16*b* configured as the inclined surfaces of the right and left bearing holders 16*x*, 16*y*, when the camshaft 61 (see FIG. 4) and the bearings 62 (see FIG. 4) are covered with the cam holder 67, a space 131 of a clearance C can be secured between the installation tool 10 and the cam holder 67. Thus, the installation tool 10 can be easily removed from the lower supporting portions 66 (see FIG. 13) (specifically, between the lower supporting portion 66 and the cam holder 67).

The right and left bearing holders 16*x*, 16*y* are formed into a shape with pointed distal ends. The lower surfaces 16*c* of the right and left bearing holders 16*x*, 16*y* are formed into a curved surface curved to be convexed downward. That is, the lower surfaces 16*c* are rounded off.

Thus, the bearing holders 16*x*, 16*y* have the shapes with the pointed distal ends and the lower surfaces 16*c* are rounded off; therefore, when the installation tool 10 is removed from the cylinder head 53, the right and left bearing holders 16*x*, 16*y* are configured to be less likely to interfere with the lower supporting portions 66 and the cam holder 67.

In FIG. 15 and FIG. 16, for example, in a case where the bottom surfaces 17*a* of the opposed concave knock portions 17 are penetrated to form cutouts instead of the right and left opposed concave knock portions 17, the installation tool 10 is sandwiched between the lower supporting portions 66 and the cam holder 67. Consequently, the installation tool 10 is less likely to be removed from the lower supporting portions 66, thus losing working efficiency. Further, a position displacement of the cam holder 67 with respect to the lower supporting portions 66 is likely to increase in the removal of the installation tool 10.

As illustrated in FIG. 1 and FIG. 14 described above, the handle 12 is disposed so as to extend in the direction different from the projecting direction of the head abutting portion 18 (Specifically, the opposite direction). This configuration allows the head abutting portion 18 of the installation tool 10 to abut on the lower supporting portions 66 as cylinder head base portions with the handle 12 on the upper portion of the installation tool 10 gripped, and allows improving working efficiency.

As illustrated in FIG. 13 and FIG. 15, the notch section 19 is disposed on the side opposite to the edge portion 22 on one side of the tool base portion 15 in the width direction facing the camshaft 61 and on the edge portion 23 on the other side of the tool base portion 15 in the width direction. The notch section 19 is a part to avoid interference with the coupling component 85, which couples the throttle body 78 (see FIG. 2) as an intake component to the cylinder head 53 (see FIG. 2).

In this configuration, the notch section 19 allows preventing the installation tool 10 from interfering with the coupling component 85 and also allows improving assembling workability.

As illustrated in FIG. 12 and FIG. 16, the opposed concave knock portions 17 as tool concave portions are parts into which the knock collars 121 as knock members are inserted. The knock collars 121 are fitted to the knock holes 120*a* provided in the lower supporting portions 66 as the cylinder head base portions to position the cam holder 67 with respect to the lower supporting portions 66.

With this configuration, removing the installation tool 10 with the cam holder 67 positioned by the opposed concave knock portions 17 facilitates the insertion of the knock collars 121 into the knock holes 120*a* and ensures easily positioning and fixing the cam holder 67 with respect to the lower supporting portions 66.

Figure 17:
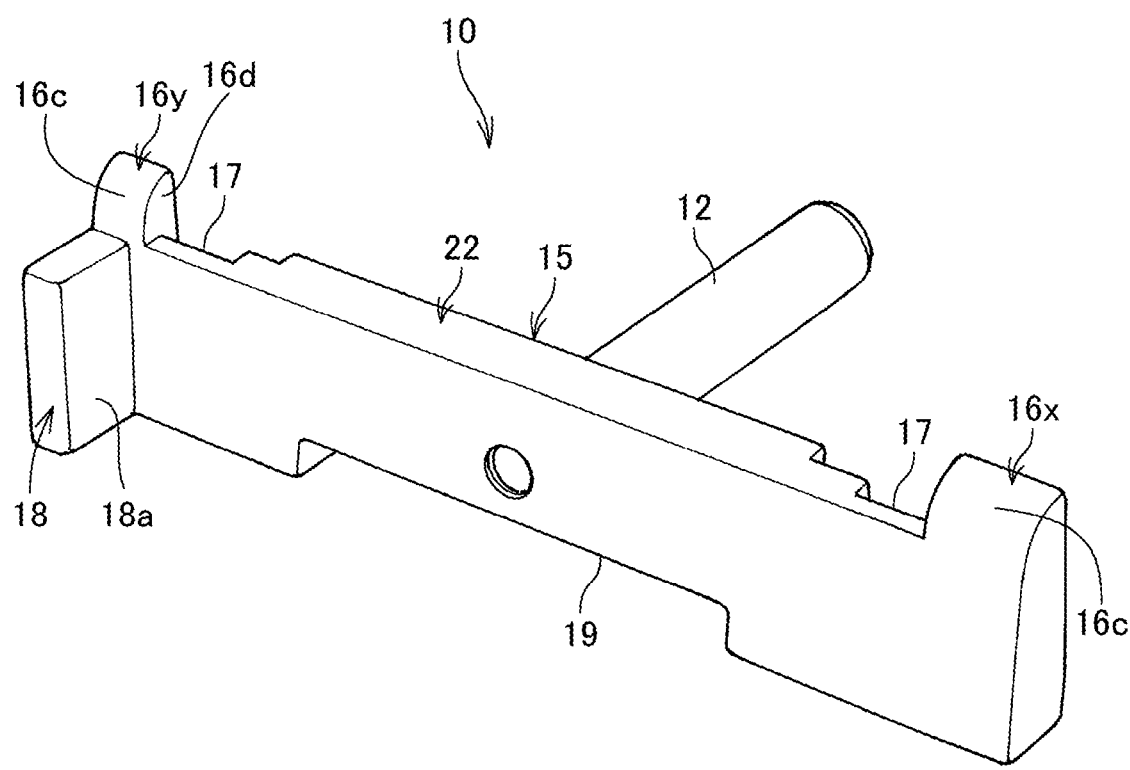
FIG. 17 is a perspective view viewing the installation tool from obliquely downward.
Figure 18:
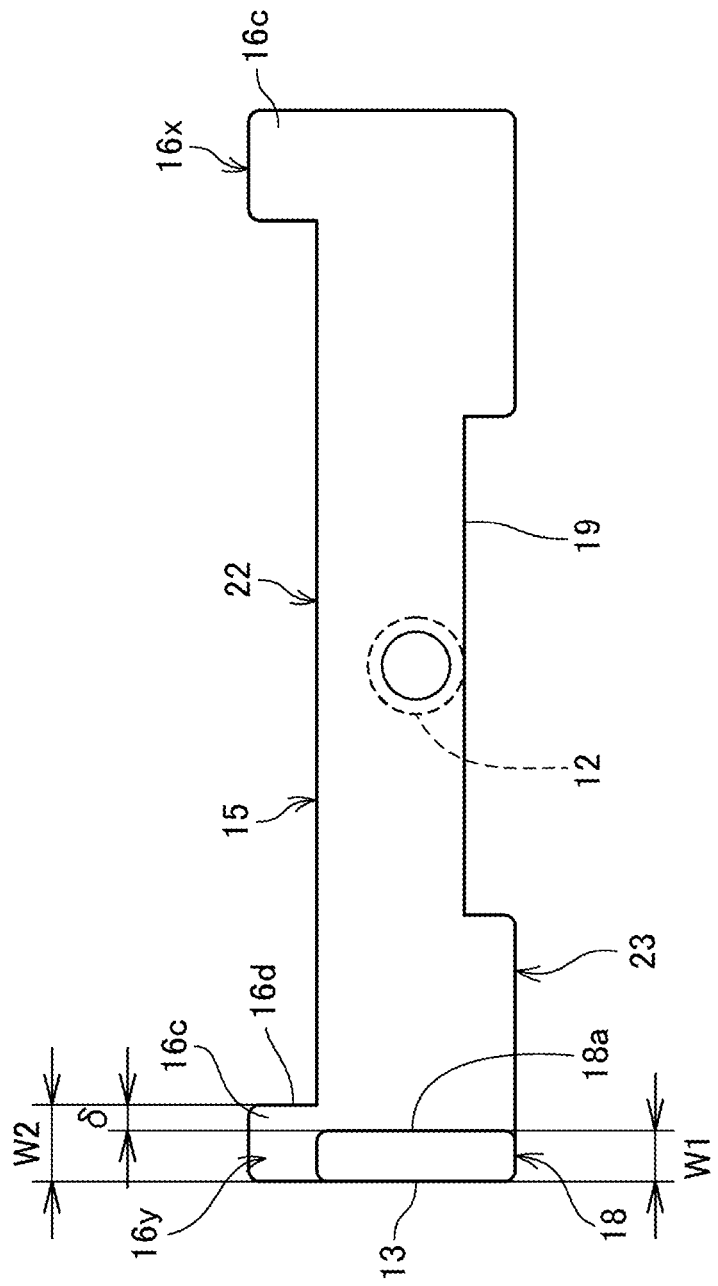
FIG. 18 is a bottom view illustrating the installation tool.

FIG. 17 is a perspective view viewing the installation tool 10 from obliquely downward. FIG. 18 is a bottom view illustrating the installation tool 10.

As illustrated in FIG. 17 and FIG. 18, in the head abutting portion 18, a longitudinal width of the tool base portion 15 in the longitudinal direction is narrower than that of the one bearing holder 16*y*. That is, defining the longitudinal width of the head abutting portion 18 as W1 and the longitudinal width of the bearing holder 16*y* as W2, W1<W2 is met.

Additionally, since the head abutting portion 18 and the bearing holder 16*y* include a common end surface 13, an end surface 16*d* of the bearing holder 16*y* is offset with respect to an end surface 18*a* on the opposite side of the head abutting portion 18 by a distance 5 to the handle 12 side in the right-left direction. That is, one bearing 62 (see FIG. 11) is located inward in the right-left direction of the cylinder head 53 (see FIG. 2) by the distance 5 from the reference surface 66*c* (see FIG. 11) of the lower supporting portion 66 (see FIG. 11). Consequently, the half-thrust washers 97 (see FIG. 11) mounted to the bearings 62 can be positioned to predetermined positions (positions fitted to the half annular grooves 123*d* on the cam holder 67).

The pair of bearing holders 16*x*, 16*y* have different widths in the longitudinal direction of the tool base portion 15, namely, the longitudinal widths. Specifically, the bearing holder 16*x* has a longitudinal width wider than that of the bearing holder 16*y*.

As illustrated in FIG. 16 and FIG. 17 described above, the bearing holders 16*x*, 16*y* have the lower surfaces 16*c* as the curved surfaces on the distal end portions.

With this configuration, when the installation tool 10 is removed from between the lower supporting portions 66, the cam holder 67, and the coupling component 85, the installation tool 10 can be less likely to interfere with the lower supporting portions 66 and the cam holder 67, thus ensuring improving assembling workability.

Figure 19:
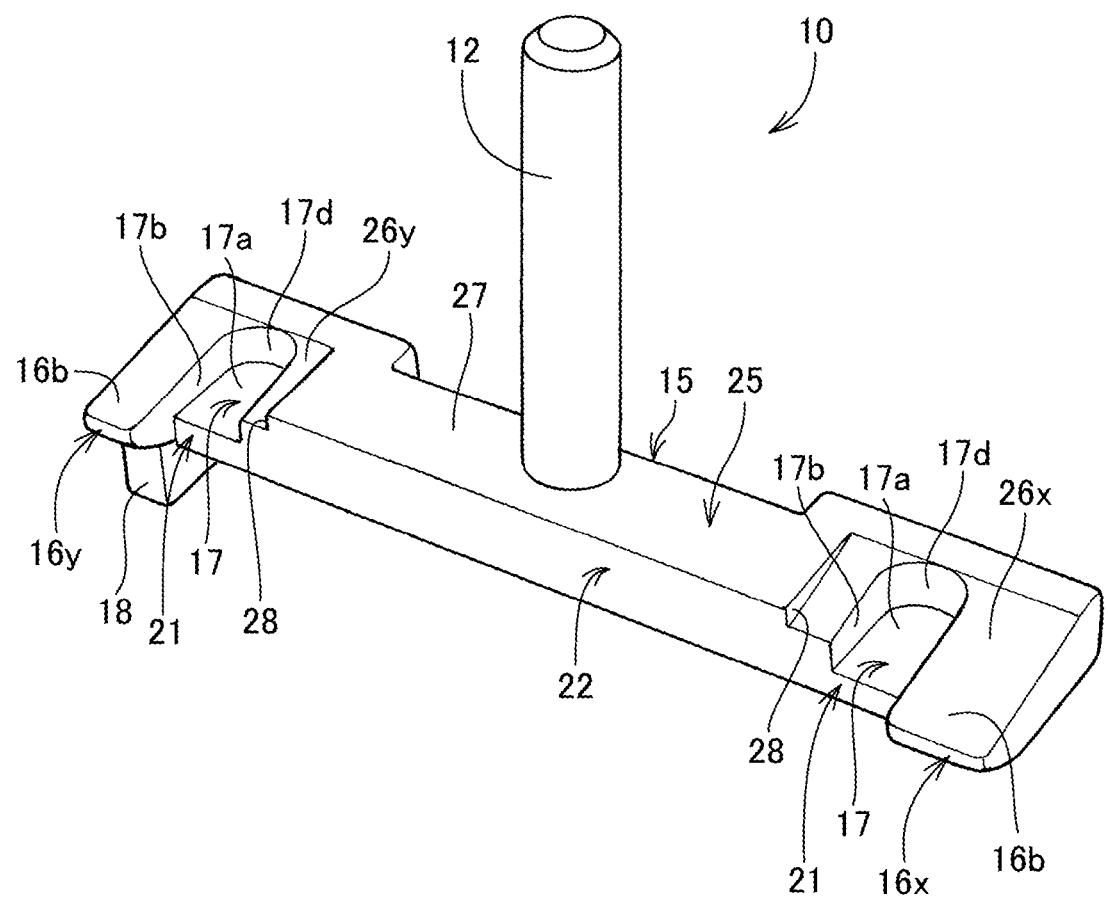
FIG. 19 is a perspective view viewing the installation tool from obliquely upward.

FIG. 19 is a perspective view viewing the installation tool 10 from obliquely upward. FIG. 20 is a front view illustrating the installation tool 10.

As illustrated in FIG. 19 and FIG. 20, between the upper inclined surfaces 26x, 26y and the upper flat surface 27 of the top surface 25, a pair of longitudinal surfaces 28 extending in the top-down direction are formed.

Defining lateral widths of the right and left sidewalls 125x, 125y of the cam holder 67 as W3 and W4, the lateral width W3 is equal to or approximately equal to the lateral width W4.

Defining a distance between the pair of longitudinal surfaces 28 as L3 and a distance between the right and left sidewalls 125x, 125y of the cam holder 67 as L4, the distance L4 is larger than the distance L3 (L4>L3).

Thus, the respective right and left sidewalls 125x, 125y of the cam holder 67 are positioned above the upper inclined surfaces 26x, 26y; therefore, when the cam holder 67 is located above the installation tool 10, the space between the cam holder 67 and the installation tool 10 can be easily secured.

As illustrated in FIG. 11, FIG. 15, FIG. 17, and FIG. 19 described above, the head abutting portion 18 projects downward from the root portion of one of the pair of bearing holders 16x, 16y (specifically, the one end portion of the tool base portion 15) and is abutted against the end portion of the lower supporting portion 66 on the side opposite to the cam sprocket 94 mounted to the one end of the camshaft 61. The opposed concave knock portions 17 have: the openings 21, which open to the projection direction of the bearing holders 16x, 16y; and the rear surfaces 17d as the curved surfaces having the arc shape in cross section configured to abut on the cylindrical knock collars 121 and as the end portions on the side opposite to the openings 21.

With this configuration, the head abutting portion 18 is abutted against the end portion (reference surface 66c) of the lower supporting portion 66 on the side opposite to the cam sprocket 94 side mounted to the one end of the camshaft 61; therefore, the cam sprocket 94 and the cam chain 95 do not become hindrance in the use of the installation tool 10. This allows easily positioning the installation tool 10 to the lower supporting portions 66.

Additionally, the end portions of the opposed concave knock portions 17 on the side opposite to the openings 21 are formed into the curved surfaces having the arc shape in cross section. Therefore, causing the tubular knock collars 121 to abut on the end portions formed into the curved surface having the arc shape in cross section allows automatically aligning the knock collars 121 with respect to the opposed concave knock portions 17 in the right-left direction. This allows accurately positioning the cam holder 67 to the installation tool 10 and allows easily fitting the knock collars 121 to the knock holes 120a (see FIG. 7) when the installation tool 10 is removed.

As illustrated in FIG. 16, FIG. 19, and FIG. 20 described above, the upper inclined surfaces 26x, 26y as the inclined surfaces, which gradually lower toward the projection direction of the bearing holders 16x, 16y, are formed at the peripheral areas of the opposed concave knock portions 17 as tool concave portions. The bearing holders 16x, 16y have the top surfaces 16b as inclined top surfaces continuous with the upper inclined surfaces 26x, 26y.

With this configuration, when the cam holder 67 is covered on the camshaft 61 and the bearings 62, the clearance can be secured between the installation tool 10 and the cam holder 67. This allows easily removing the installation tool 10 from between the lower supporting portions 66 and the cam holder 67.

The pair of upper inclined surfaces 26x, 26y are formed independently so as to face the pair of sidewalls 125x, 125y, which are formed on the cam holder 67 and configured to abut on the lower supporting portions 66.

With this configuration, by independently forming the pair of upper inclined surfaces 26x, 26y, when the cam holder 67 is located above the installation tool 10, the space between the cam holder 67 and the installation tool 10 can be easily secured, and the upper inclined surfaces 26x, 26y can be easily formed compared with continuous formation of one upper inclined surface.

FIG. 21 is a flowchart depicting the crankshaft installation method.

The respective steps are described with the related drawings.

The pair of bearings mounted to the camshaft are placed on the right and left lower supporting portions (cylinder head base portions) (Step S1).

The half-thrust washers are installed to the pair of bearings (specifically, the annular grooves in the bearings) (Step S2).

The pair of bearings are moved to predetermined positions (specifically, the positions abutting on the annular extruding portions) of the camshaft (Step S3).

The pair of bearings are sandwiched between the bearing holders of the installation tool to be held (Step S4).

With the pair of bearings sandwiched to be held, the head abutting portion on the installation tool is abutted against the reference surface of the lower supporting portion (Step S5).

In this step, the pair of bearings and the camshaft are positioned to the right and left lower supporting portions via the installation tool.

The right and left lower supporting portions are covered with the cam holder, and the knock collars of the cam holder are inserted into the opposed concave knock portions of the installation tool (Step S6).

In this step, the cam holder (specifically, the half annular grooves) are positioned to the right and left lower supporting portions via the installation tool.

While the cam holder is held so as not to change the position of the cam holder, the installation tool is removed from the cylinder head (Step S7).

This fits the half annular grooves of the cam holder to the half-thrust washers and the knock collars fit to the knock holes.

After the installation tool is removed in this step, as necessary, the position and inclination of the cam holder with respect to the lower supporting portions are finely adjusted to promote the fitting of the half annular grooves in the cam holder to the half-thrust washers and fitting of the knock collars to the knock holes.

The cam holder is fixed to the right and left lower supporting portions with the bolts (Step S8).

Note that as long as performed before the step of covering the right and left lower supporting portions with the cam holder (Step S6), the step of installing the half-thrust washers to the bearings (Step S2) may be performed after any of the steps of Steps S3 to S5.

(1) The main distinctive configurations of the above-described installation tool 10 are as follows.

As illustrated in FIG. 1, FIG. 3 to FIG. 5, and FIG. 7 described above, the cylinder head 53 (see FIG. 2) of the internal combustion engine 50 is provided with the lower supporting portions 66 disposed in the head body 65, the cam holder 67, and the half-thrust washers 97.

The camshaft 61 is sandwiched by the lower supporting portions 66 and the cam holder 67 via the bearings 62. The half-thrust washers 97 as the semi-circular members are inserted into the annular grooves 62c as bearing side concave portions provided in the outer peripheral surfaces 62b of the bearings 62 and the half annular grooves 123d as holder side concave portions provided in the inner peripheral surfaces 123c (see FIG. 8) of the cam holder 67.

The installation tool 10 is to install the camshaft 61 to the lower supporting portions 66 and includes the bearing holders 16x, 16y, the head abutting portion 18, and the opposed concave knock portions 17.

The bearing holders 16x, 16y hold the pair of bearings 62. With the pair of bearings 62 held, the head abutting portion 18 is abutted against the reference surface 66c of the lower supporting portion 66. The opposed concave knock portions 17 as tool concave portions are parts into which the knock collars 121 as the knock members provided in the cam holder 67 for adjusting the positions of the half annular grooves 123d as holder side concave portions to the half-thrust washers 97 are inserted.

(2) Distinctive steps regarding the crankshaft installation method are as follows (for reference numerals in the description, see FIG. 1 to FIG. 5 and FIG. 7).

The cylinder head 53 in the internal combustion engine 50 is provided with the lower supporting portions 66 and the cam holder 67 between which the camshaft 61 is sandwiched with the lower supporting portions 66 via the bearings 62.

The camshaft installation method that installs the camshaft 61 to the lower supporting portions 66 using the installation tool 10 includes a bearing locating step, a washer inserting step, a bearing holding step, a bearing/camshaft positioning step, a half annular groove position adjusting step, an installation tool removing step, and a cam holder fixing step.

The bearing locating step is a step that places (locates) the pair of respective bearings 62 mounted to the camshaft 61 on the pair of concave portions with the semicircular shape in cross section formed in the lower supporting portions 66.

The washer inserting step is a step of inserting the half-thrust washers 97 into the annular grooves 62c disposed in the outer peripheral surfaces of the bearings 62.

The bearing holding step is a step of holding the pair of bearings 62 sandwiched between the bearing holders 16x, 16y disposed in the installation tool 10.

The bearing/camshaft positioning step is a step of causing the head abutting portion 18 disposed on the installation tool 10 to abut on the reference surface 66c disposed on the one end portion of the lower supporting portion 66 with the pair of bearings 62 held and positioning the bearings 62 and the camshaft 61 with respect to the lower supporting portions 66.

The half annular groove position adjusting step is a step that covers the lower supporting portions 66 with the cam holder 67 provided with the half annular grooves 123d into which the half-thrust washers 97 are inserted, and inserts the knock collars 121 provided in the cam holder 67 into the opposed concave knock portions 17 disposed in the installation tool 10 to position the cam holder 67 with respect to the installation tool 10 and adjust the positions of the half annular grooves 123d to the half-thrust washers 97 (specifically, positioning in the right-left direction).

The installation tool removing step is a step of removing the installation tool 10 from the cylinder head 53 (specifically, the lower supporting portion 66).

The cam holder fixing step is a step of fixing the cam holder 67 to the lower supporting portions 66.

With the above-described (1) and (2), even when the bearings 62 and the half-thrust washers 97 covered with the cam holder 67 are in poor visibility, the cam holder 67 can be located at the predetermined position with respect to the lower supporting portions 66 without relying on the hunch of the worker. This allows easily adjusting the positions of the half annular grooves 123d to the half-thrust washers 97 and inserting the half-thrust washers 97 into the half annular grooves 123d, thereby ensuring improving the assembling property of the camshaft 61 to the lower supporting portions 66.

As illustrated in FIG. 10 and FIG. 12 described above, the pair of bearing holders 16x, 16y are disposed. The pair of bearings 62, which are disposed on both sides of the pair of intake cams 91 and the pair of exhaust cams 92 as the cams provided in the camshaft 61 and covered with the integrated cam holder 67 from the above, are sandwiched between the bearing holders 16x, 16y to be held.

With this configuration, even without dividing the cam holder 67 covering the pair of bearings 62 plurally into the right and left, the front and rear, and the like, the assembling property of the camshaft 61 can be improved with the use of the integrally formed cam holder 67. The pair of bearings 62 being sandwiched between the pair of bearing holders 16x, 16y allows preventing a position displacement of the pair of bearings 62.

As illustrated in FIG. 2 to FIG. 4 and FIG. 7 described above, the internal combustion engine 50 includes the cylinder head 53 provided with the lower supporting portions 66, the cam holder 67, the half-thrust washers 97, and the knock collars 121.

The camshaft 61 is sandwiched between the cam holder 67 and the lower supporting portions 66 via the bearings 62. The half-thrust washers 97 are inserted into the respective annular grooves 62c, which are provided on the outer peripheral surfaces of the bearings 62, and half annular grooves 123d provided in the cam holder 67. The knock collars 121 are disposed on the cam holder 67 to position the cam holder 67 with respect to the lower supporting portions 66.

The half-thrust washers 97 are the semi-circular members configured by halving a circular, annular-shaped member. The lower supporting portions 66 restrict the axial movement of the camshaft 61 via the bearings 62, the half-thrust washers 97, and the cam holder 67.

Specifically, as illustrated in FIG. 9, the half-thrust washers 97 are inserted into the annular grooves 62c in the bearings 62 placed on the lower supporting portions 66, and the knock collars 121 on the cam holder 67 are fitted to the knock holes 120a while the half annular grooves 123d in the cam holder 67 are fitted to the half-thrust washers 97. Thus, the axial movement of the camshaft 61 with respect to the lower supporting portions 66 is restricted.

To restrict the axial movement of the camshaft 61, for example, the following is considered. A concave portion is formed in a cylinder head base portion, a positioning member is inserted into this concave portion, and the positioning member is inserted into a concave portion formed in an outer peripheral surface of a bearing supporting a camshaft. In contrast to this, this internal combustion engine 50 positions the camshaft 61 to the lower supporting portions 66 via the bearings 62, the half-thrust washers 97, and the cam holder 67 to restrict the axial movement of the camshaft 61. This eliminates the need for forming the concave portion into which the positioning member is inserted in the lower supporting portions 66, ensures reduction in machining man-hour for the lower supporting portions 66, and ensures reduction in cost of the cylinder head 53.

To install the camshaft 61 to the lower supporting portions 66, positioning the camshaft 61, the bearings 62, and the cam holder 67 to the lower supporting portions 66 with the use of the installation tool 10 allows effectively installing the camshaft 61.

The above-described embodiments are given to merely illustrate an aspect of the present invention, and any modification and application are possible without departing from the spirit of the present invention.

For example, as illustrated in FIG. 11, while the head abutting portion 18 is included in the installation tool 10, the installation tool may include the head abutting portion 18 and a second head abutting portion to be abutted against the lower supporting portion 66 to position the installation tool 10 in the front-rear direction.

REFERENCE SIGNS LIST

10 . . . Installation tool
12 . . . Handle
16b . . . Top surface (inclined top surface)
16c . . . Lower surface (curved surface)
16x, 16y . . . Bearing holder
17 . . . Opposed concave knock portion (tool concave portion)
17d . . . Rear surface (curved surface)
18 . . . Head abutting portion
19 . . . Notch section
22, 23 . . . Edge portion
26x, 26y . . . Upper inclined surface (inclined surface)
50 . . . Internal combustion engine
53 . . . Cylinder head
61 . . . Camshaft
62 . . . Bearing
62c . . . Annular groove (bearing side concave portion)
66 . . . Lower supporting portion (cylinder head base portion)
66a . . . Knock hole
66c . . . Reference surface (predetermined position)
67 . . . Cam holder
78 . . . Throttle body (intake component)
85 . . . Coupling component
91 . . . Intake cam (cam)
92 . . . Exhaust cam (cam)
94 . . . Cam sprocket
97 . . . Half-thrust washer (semi-circular member, positioning member)
120a . . . Knock hole
121 . . . Knock collar (knock member)
123d . . . Half annular groove (holder side concave portion)
125x, 125y . . . Sidewall

The invention claimed is:

1. An installation tool for installing a camshaft to a cylinder head base portion of a cylinder head of an internal combustion engine, the cylinder head including the cylinder head base portion, a cam holder, and a semi-circular member, the camshaft being sandwiched between the cam holder and the cylinder head base portion via a bearing that is cylindrical, the semi-circular member being inserted into respective bearing side concave portion disposed in an outer peripheral surface of the bearing and holder side concave portion disposed in the cam holder,
wherein the installation tool includes:
a tool base portion that extends in a longitudinal direction with a width direction which is orthogonal to the longitudinal direction;
a bearing holder that projects from the tool base portion at one side of the tool base portion in the width direction and holds the bearing;
a head abutting portion that projects from the tool base portion to be abutted against a reference surface of the cylinder head base portion with the bearing held; and
a tool concave portion into which a knock member disposed in the cam holder is inserted to adjust a position of the holder side concave portion with respect to the semi-circular member,
the longitudinal direction corresponds to an axis direction of the camshaft,
the head abutting portion includes an end surface that abuts on the reference surface in the axis direction,
the bearing holder includes a holding surface at a position in which the holding surface abuts on an end surface of the bearing to position the bearing in the axis direction in a state where the end surface of the head abutting portion abuts on the reference surface, and
the tool concave portion includes a surface positioned to abut on the knock member to position the cam holder in the axis direction in the state where the end surface of the head abutting portion abuts on the reference surface.

2. The installation tool according to claim 1, comprising a handle disposed so as to extend in a direction different from a projecting direction of the head abutting portion.

3. The installation tool according to claim 1, comprising a notch section disposed on an edge portion on a side opposite to an edge portion facing the camshaft, the notch section avoiding interference with a coupling component coupling an intake component to the cylinder head.

4. The installation tool according to claim 1, wherein the bearing holder has a curved surface on a distal end portion.

5. The installation tool according to claim 1, wherein a pair of the bearing holders are disposed, the pair of bearings being disposed on both sides of a cam provided in the camshaft and covered with the integrated cam holder from an above, the pair of bearings being sandwiched between the bearing holders to be held.

6. The installation tool according to claim 1,
wherein the tool concave portion is a part into which the knock member is inserted, the knock member being fitted to a knock hole disposed in the cylinder head base portion to position the cam holder with respect to the cylinder head base portion.

7. The installation tool according to claim 1,
wherein the head abutting portion projects downward from a root portion of one of the pair of bearing holders and is abutted against an end portion of the cylinder head base portion on a side opposite to a cam sprocket mounted to one end of the camshaft, the tool concave portion having an opening to a projection direction of the bearing holder, the surface of the tool concave portion is a curved surface having an arc shape in cross section configured to abut on the cylindrical knock member as an end portion on a side opposite to the opening.

8. The installation tool according to claim 1,
wherein an inclined surface that gradually lowers toward a projection direction of the bearing holder is formed at a peripheral area of the tool concave portion, the bearing holder having an inclined top surface continuous with the inclined surface.

9. The installation tool according to claim 8,
wherein a pair of the inclined surfaces are formed independently so as to face a pair of sidewalls, the pair of sidewalls being formed on the cam holder and configured to abut on the cylinder head base portion.

10. A camshaft installation method that installs a camshaft to a cylinder head base portion of a cylinder head in an internal combustion engine using an installation tool according to claim 1, the cylinder head including the cylinder head base portion and a cam holder sandwiching the camshaft with the cylinder head base portion via a bearing that is cylindrical, the camshaft installation method comprising:
a step of locating the bearing mounted to the camshaft to the cylinder head base portion;
a step of inserting a semi-circular member into a bearing side concave portion disposed in an outer peripheral surface of the bearing;
a step of holding the bearing by the bearing holder disposed in the installation tool by locating the installation tool such that the longitudinal direction corresponds to the axis direction and by making the holding surface abut on the end surface of the bearing;
a step of abutting the end surface of the head abutting portion disposed in the installation tool against a reference surface disposed on one end portion of the cylinder head base portion with the bearing held to position the bearing and the camshaft with respect to the cylinder head base portion;
a step of covering the cam holder including a holder side concave portion into which the semi-circular member is inserted over the cylinder head base portion, inserting a knock member disposed in the cam holder into the tool concave portion disposed in the installation tool and making the surface of the tool concave portion abut on the knock member to position the cam holder with respect to the installation tool, so as to adjust a position of the holder side concave portion with respect to the semi-circular member;
a step of removing the installation tool from the cylinder head; and
a step of fixing the cam holder to the cylinder head base portion.

11. The installation tool according to claim 2, comprising a notch section disposed on an edge portion on a side opposite to an edge portion facing the camshaft, the notch section avoiding interference with a coupling component coupling an intake component to the cylinder head.

12. The installation tool according to claim 2, wherein the bearing holder has a curved surface on a distal end portion.

13. An installation tool for installing a camshaft to a cylinder head base portion of a cylinder head of an internal combustion engine, the cylinder head including the cylinder head base portion, a cam holder, and a semi-circular member, the camshaft being sandwiched between the cam holder and the cylinder head base portion via a bearing, the semi-circular member being inserted into respective bearing side concave portion disposed in an outer peripheral surface of the bearing and holder side concave portion disposed in the cam holder,
wherein the installation tool includes:
a bearing holder that holds the bearing;
a head abutting portion abutted against a reference surface of the cylinder head base portion with the bearing held;
a tool concave portion into which a knock member disposed in the cam holder is inserted to adjust a position of the holder side concave portion with respect to the semi-circular member; and
a notch section disposed on an edge portion on a side opposite to an edge portion facing the camshaft, the notch section avoiding interference with a coupling component coupling an intake component to the cylinder head, and
the bearing holder has a curved surface on a distal end portion.

14. The installation tool according to claim 2, wherein a pair of the bearing holders are disposed, the pair of bearings being disposed on both sides of a cam provided in the camshaft and covered with the integrated cam holder from an above, the pair of bearings being sandwiched between the bearing holders to be held.

15. The installation tool according to claim 3, wherein a pair of the bearing holders are disposed, the pair of bearings being disposed on both sides of a cam provided in the camshaft and covered with the integrated cam holder from an above, the pair of bearings being sandwiched between the bearing holders to be held.

16. The installation tool according to claim 4, wherein a pair of the bearing holders are disposed, the pair of bearings being disposed on both sides of a cam provided in the camshaft and covered with the integrated cam holder from an above, the pair of bearings being sandwiched between the bearing holders to be held.

17. The installation tool according to claim 2,
wherein the tool concave portion is a part into which the knock member is inserted, the knock member being fitted to a knock hole disposed in the cylinder head base portion to position the cam holder with respect to the cylinder head base portion.

18. The installation tool according to claim 3,
wherein the tool concave portion is a part into which the knock member is inserted, the knock member being fitted to a knock hole disposed in the cylinder head base portion to position the cam holder with respect to the cylinder head base portion.

19. The installation tool according to claim 4,
wherein the tool concave portion is a part into which the knock member is inserted, the knock member being fitted to a knock hole disposed in the cylinder head base portion to position the cam holder with respect to the cylinder head base portion.

* * * * *